US007928167B2

(12) United States Patent
Whitehouse

(10) Patent No.: US 7,928,167 B2
(45) Date of Patent: *Apr. 19, 2011

(54) PHA BLENDS

(75) Inventor: Robert S. Whitehouse, Lexington, MA (US)

(73) Assignee: Metabolix Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/851,213

(22) Filed: Aug. 5, 2010

(65) Prior Publication Data

US 2010/0305280 A1 Dec. 2, 2010

Related U.S. Application Data

(63) Continuation of application No. 10/783,995, filed on Feb. 20, 2004, now Pat. No. 7,781,539.

(60) Provisional application No. 60/449,187, filed on Feb. 21, 2003.

(51) Int. Cl.
C08G 63/06 (2006.01)

(52) U.S. Cl. ...................................... 525/450

(58) Field of Classification Search .................. 525/450
See application file for complete search history.

(56) References Cited

U.S. PATENT DOCUMENTS

| 3,563,971 A | 2/1971 | Wood et al. |
| 4,511,687 A | 4/1985 | Nakanishi et al. |
| 4,562,245 A | 12/1985 | Stageman |
| 4,804,691 A | 2/1989 | English et al. |
| 4,946,930 A | 8/1990 | Takasa et al. |
| 4,968,611 A | 11/1990 | Traussnig et al. |
| 5,169,889 A | 12/1992 | Kauffman et al. |
| 5,191,037 A | 3/1993 | Doi et al. |
| 5,192,612 A | 3/1993 | Otter et al. |
| 5,213,976 A | 5/1993 | Blauhut et al. |
| 5,252,646 A | 10/1993 | Iovine et al. |
| 5,312,850 A | 5/1994 | Iovine et al. |
| 5,342,868 A | 8/1994 | Kimura et al. |
| 5,382,679 A | 1/1995 | Galzigna |
| 5,387,623 A | 2/1995 | Ryan et al. |
| 5,395,919 A | 3/1995 | Lee et al. |
| 5,502,116 A | 3/1996 | Noda |
| 5,502,158 A | 3/1996 | Sinclair et al. |
| 5,536,419 A | 7/1996 | Escalona et al. |
| 5,536,564 A | 7/1996 | Noda |
| 5,550,173 A | 8/1996 | Hammond et al. |
| 5,614,576 A | 3/1997 | Rutherford et al. |
| 5,646,217 A | 7/1997 | Hammond |
| 5,656,367 A | 8/1997 | Iovine et al. |
| 5,658,646 A | 8/1997 | Takano et al. |
| 5,693,285 A | 12/1997 | Ishii et al. |
| 5,693,389 A | 12/1997 | Liggat |
| 5,700,344 A | 12/1997 | Edgington et al. |
| 5,711,842 A | 1/1998 | Kemmish |
| 5,753,364 A | 5/1998 | Rutherford et al. |
| 5,753,724 A | 5/1998 | Edgington et al. |
| 5,821,299 A | 10/1998 | Noda |
| 5,824,693 A | 10/1998 | Goldberg |
| 5,853,876 A | 12/1998 | Takano et al. |
| 5,894,062 A | 4/1999 | Liddell |
| 5,942,597 A | 8/1999 | Noda et al. |
| 5,952,405 A | 9/1999 | Schoenberg et al. |
| RE36,548 E | 2/2000 | Noda |
| 6,043,063 A | 3/2000 | Kurdikar et al. |
| 6,083,729 A | 7/2000 | Martin et al. |
| 6,086,997 A | 7/2000 | Patel et al. |
| 6,087,471 A | 7/2000 | Kurdikar et al. |
| 6,111,006 A * | 8/2000 | Waddington .................. 524/404 |
| 6,191,203 B1 | 2/2001 | Asrar et al. |
| 6,197,749 B1 | 3/2001 | Hamuro et al. |
| 6,221,316 B1 | 4/2001 | Hanggi et al. |
| 6,228,934 B1 * | 5/2001 | Horowitz et al. ............. 524/800 |
| 6,228,954 B1 | 5/2001 | Kaplan et al. |
| 6,290,803 B1 | 9/2001 | Maksymkiw et al. |
| 6,306,904 B1 | 10/2001 | Gordziel |
| 6,307,003 B1 | 10/2001 | Grigat et al. |
| 6,319,352 B1 | 11/2001 | Simmler et al. |
| 6,340,580 B1 | 1/2002 | Horowitz |
| 6,365,680 B1 | 4/2002 | Edgington et al. |
| 6,369,106 B1 | 4/2002 | Atlas et al. |
| 6,472,502 B1 | 10/2002 | Jurgens et al. |
| 6,515,054 B1 | 2/2003 | Matsushita et al. |
| 6,586,404 B1 | 7/2003 | Demopolos et al. |
| 6,709,848 B1 | 3/2004 | Martin et al. |
| 6,780,911 B2 | 8/2004 | Zhong et al. |
| 6,808,795 B2 * | 10/2004 | Noda et al. .................... 428/221 |
| 6,838,037 B2 | 1/2005 | Autran et al. |
| 7,098,292 B2 | 8/2006 | Zhao et al. |
| 7,252,980 B2 | 8/2007 | Walsem et al. |

(Continued)

FOREIGN PATENT DOCUMENTS

BR PI 9302312-0 7/1995

(Continued)

OTHER PUBLICATIONS

Abe et al. "Synthesis and Characterization of Poly[(R,S)-3-hydroxybutyrate-b-6-hydroyhexanoate] as a Compatibilizer for a Biodegradable blend of Poly[(R)-3-hydroxybutyrate] and Poly(6-hydroxyhexanoate)", Macromolecules, 27(21): 6012-6017 (1994).
Avella et al., "Poly(3-hydroxybutyrate)/poly(methyleneoxide) blends: thermal, crystallization and mechanical behaviour", Polymer, vol. 38, No. 25, pp. 6135-6143 (1997).
Blümm et al., "Miscibility, crystallization and melting of poly(3-hydroxybutyrate/poly(L-lactide) blends", Polymer, vol. 36, No. 21, pp. 4077-4081 (1995).
Chen et al., "Miscibility and morphology of blends of poly(3-hydroxybutyrate) and poly(vinyl butyral) Polymer", vol. 42, pp. 8407-8414 (2001).
Chiu et al.; "Crystallization induced microstructure of crystalline/crystalline poly (vinylidenefluoride)/poly(3-hydroxybutyrate) blends probed by a small angle X-ray scattering", Polymer, vol. 42, pp. 5749-5754 (2001).
Choe et al., "Miscibility of poly(3-hydroxybutyrate-co-3hydroxyvalerate) and poly(vinyl chloride) blends", Polymer, vol. 36, No. 26, pp. 4977-4982 (1995).
Chun et al., "Thermal properties of poly(hydroxybutyrate-co-hydroxyvalerate) and poly(ecaprolactone) blends", Polymer, vol. 41, pp. 2305-2308 (2000).

(Continued)

Primary Examiner — Vickey Nerangis
(74) Attorney, Agent, or Firm — Foley & Lardner LLP

(57) ABSTRACT

This invention relates to blends containing two or more polyhydroxyalkanoates (PHAs), and related methods and articles.

13 Claims, No Drawings

U.S. PATENT DOCUMENTS

| | | | |
|---|---|---|---|
| 7,781,539 B2 * | 8/2010 | Whitehouse | 525/450 |
| 2002/0058316 A1 | 5/2002 | Horowitz | |
| 2002/0068810 A1 | 6/2002 | Whitehouse et al. | |
| 2002/0077269 A1 | 6/2002 | Whitehouse et al. | |
| 2002/0143116 A1 | 10/2002 | Noda et al. | |
| 2002/0143136 A1 | 10/2002 | Noda et al. | |
| 2002/0156128 A1 | 10/2002 | Williams et al. | |
| 2003/0143116 A1 | 7/2003 | Zheng et al. | |
| 2004/0220355 A1 | 11/2004 | Whitehouse | |
| 2006/0247390 A1 | 11/2006 | Whitehouse et al. | |

FOREIGN PATENT DOCUMENTS

| | | |
|---|---|---|
| CA | 2234965 | 5/1997 |
| DE | 43 00 420 | 7/1994 |
| DE | 44 30 415 | 3/1996 |
| DE | 197 50 371 | 11/1997 |
| DE | 93 04 018 | 10/1998 |
| EP | 0 300 480 | 1/1989 |
| EP | 0 450 777 | 10/1991 |
| EP | 0 494 405 | 7/1992 |
| EP | 0 501 641 | 9/1992 |
| EP | 0 553 394 | 8/1993 |
| EP | 0 572 110 | 12/1993 |
| EP | 0 609 713 | 8/1994 |
| EP | 0 741 177 | 11/1996 |
| EP | 0 826 803 | 3/1998 |
| EP | 0 890 614 | 1/1999 |
| EP | 1 193 294 | 4/2002 |
| EP | 1 236 753 | 9/2002 |
| EP | 1 593 705 | 11/2005 |
| FR | 2656620 | 7/1991 |
| GB | 2 136 003 | 9/1984 |
| JP | 57-030776 | 2/1982 |
| JP | 58-046277 | 10/1983 |
| JP | 01-286820 | 11/1989 |
| JP | 05-339557 | 12/1993 |
| JP | 06-340786 | 12/1994 |
| JP | 11-302521 | 11/1999 |
| JP | 2001-316658 | 11/2001 |
| JP | 2002-532618 | 10/2002 |
| WO | WO-94/10257 | 5/1994 |
| WO | WO-94/28070 | 12/1994 |
| WO | WO-95/02649 | 1/1995 |
| WO | WO-95/10577 | 4/1995 |
| WO | WO-95/20615 | 8/1995 |
| WO | WO-96/05264 | 2/1996 |
| WO | WO-96/08535 | 3/1996 |
| WO | WO-97/04036 | 2/1997 |
| WO | WO 9707153 A1 * | 2/1997 |
| WO | WO-98/29375 | 7/1998 |
| WO | WO-98/46782 | 10/1998 |
| WO | WO-99/23146 | 5/1999 |
| WO | WO-00/37119 | 6/2000 |
| WO | WO-01/15671 | 3/2001 |
| WO | WO-01/68890 | 9/2001 |
| WO | WO-01/80832 | 11/2001 |
| WO | WO-02/10303 | 2/2002 |
| WO | WO-02/17962 | 3/2002 |
| WO | WO-02/28969 | 4/2002 |
| WO | WO-02/50156 | 6/2002 |
| WO | WO-02/005581 | 7/2002 |
| WO | WO-02/059201 | 8/2002 |
| WO | WO-02/077080 | 10/2002 |
| WO | WO-02/085983 | 10/2002 |
| WO | WO-02/090314 | 11/2002 |
| WO | WO-2005/025570 | 3/2005 |

OTHER PUBLICATIONS

Class et al., "The Viscoelastic Properties of Rubber-Resin Blends. III. The Effect of Resin Concentration", J. Appl. Poly Sci., vol. 30, No. 2, pp. 825-842 (1985).

Class et al., "The Viscoelastic Properties of Rubber-Resin Blends. I. The Effect of Resin Structure", J. Appl. Poly Sci., vol. 30, No. 2, pp. 805-814 (1985).

Class et al., "The Viscoelastic Properties of Rubber-Resin Blends. II. The Effect of Resin Molecular Weight", J. Appl. Poly Sci., vol. 30, No. 2, pp. 815-824 (1985).

Fujita et al., "Effects of Miscibility on Peel Strength of Natural-Rubber-Based Pressure-Sensitive Adhesives", J. Appl. Poly Sci., vol. 70, No. 4, pp. 777-784 (1998).

Fujita et al., "Effects on Miscibility on Probe Tack of Natural-Rubber-Based Pressure-Sensitive Adhesives", J. Appl. Poly Sci., vol. 70, No. 4, pp. 771-776 (1998).

Fujita et al., "Miscibility Between Natural Rubber and Tackifiers. I. Phase Diagrams of the Blends of Natural Rubber with Rosin and Terpene Resins", J. Appl. Poly Sci., vol. 64, No. 11, pp. 2191-2197 (1997).

Goh et al., "A completely miscible ternary blend system of poly(3-hydroxybutyrate), poly(ethylene oxide) and polyepichlorohydrin", Polymer, vol. 40, pp. 5733-5735 (1999).

Hay et al., "Crystallisation of poly(3-hydroxybutyrate)/polyvinyl acetate blends", Polymer, vol. 41, pp. 5749-5757 (2000).

Hideki, A., et al., "Synthesis and Characterization of Poly[(R,S)-3-hydroxybutyrate-b-6-hydroxyhexanoate] as a Compatibilizer for a Biodegradable Blend of Poly[(R)-3-hydroxybutyrate] and Poly(6-hydroxyhexanoate),"Macromolecules, vol. 27, No. 21: 6012-6017 (1994).

Hobbs et al., "The effect of water on the crystallization of thin films of poly(hydroxybutyrate)", Polymer, vol. 38, No. 15, pp. 3879-3883 (1997).

Innance et al., "Poly(3-hydroxybutyrate)-co-(3-hydroxyvalerate)/Poly-L-Lactide Blends: Thermal and Mechanical Properties", Journal of Applied Polymer Science, 54:1525-1535 (1994).

Iriondo et al., "Thermal and infra-red spectroscopic investigations of a miscible blend composed of poly(vinyl phenol) and poly(hydroxybutyrate)", Polymer, vol. 36, No. 16, pp. 3235-3237 (1995).

Iwata, "Role of entanglement in crystalline polymers 1. Basic theory", Polymer, vol. 43, pp. 6609-6626 (2002).

Kim et al., "Miscibility and Pee Strength of Acrylic Pressure-Sensitive Adhesives: Acrylic Copolymer-Tackifier Resin Systems", J. Appl. Poly Sci., vol. 56, No. 2, pp. 201-2009 (1995).

Kleinman W A et al.: "Status of gluthathione and other thiols and disulfides in human plasma." Biochemical Pharmacology. Jul. 1, 2000, vol. 60, No. 1, Jul. 1, 2000, pp. 19-29.

Luo et al., "The effect of molecular weight on the lamellar structure, thermal and mechanical properties of poly(hydroxybutyrate-co-hydroxyvalerates)", Polymer, vol. 43, pp. 4159-4166 (2002).

Maekawa et al., "Miscibility and tensile properties of poly (β-hydroxybutyrate)-cellulose propionate blends", Polymer, vol. 40, pp. 1501-1505 (1999).

Mallardé et al., "Hydrolytic Degradability of poly(3-hydroxyoctanoate) and of a poly(3-hydroxyoctanoate)/poly(R,S-latic acid) Blend", Polymer, 39(15): 3387-3392 (1998).

McNally et al., "Polyimide-12 layered silicate nanocomposites by melt blending", Polymer vol. 44, pp. 2761-2772 (2003).

Miguel et al., "Blends of bacterial poly(3-hydroxybutyrate) with synthetic poly(3-hydroxybutyrate) and poly(epichlorohydrin): transport properties of carbon dioxide and water vapour", Polymer, vol. 42, pp. 953-962 (2001).

Mizumachi et al., "Theory of Tack of Pressure-Sensitive Adhesive. II" J. Appl. Poly Sci., vol. 37, No. 11, pp. 3097-3104 (1989).

Nagasawa et al.: "Protection against acetaminophen-induced hepatotoxicity by L-CySSME and its N-acetyl and ethyl ester derivatives." Journal of Biochemical toxicology, 1996, vol. 11, No. 6, pp. 289-295.

Nakajima et al., "Rheology, Composition, and Peel-Mechanism of Block Copolymer-Tackifier-Based Pressure Sensitive Adhesives", J. Appl. Poly Sci., vol. 44, No. 8, pp. 1437-1456 (1992).

Ohkoshi et al., "Miscibilitiy and solid-state structures for blends of poly[(S)-lactide] with atactic poly[(R,S)-3-hydroxybutyrate]", Polymer, vol. 41, pp. 5985-5992 (2000).

Paul et al., "New nanocomposite materials based on plasticized poly(L-lactide) and organo-modified montmorillonites: thermal and morphological study", Polymer, vol. 44, pp. 443-450 (2003).

Purdie J. W., "Gamma-Radiolysis of Cysteine-Cysteamine Disulfide in Aqueous solution" Canadian J. of Chemistry, vol. 49, 1971, pp. 725-730.

Qiu et al., "Melting behaviour of poly(butylenes succinate) in miscible blends with poly(ethylene oxide)", Polymer, vol. 44, pp. 3095-3099 (2003).

Qiu et al., "Miscibility and crystallization of poly(ethylene oxide) and poly(βcaprolactone) blends", Polymer, vol. 44, pp. 3101-3106 (2003).

Sato S. et al.: "Indentification of thioether intermediates in the reductive transformation of gonyautoxins into saxitoxins by thiols.", Bioorganic & Medicinal Chemistry Letters. Aug. 21, 2000, vol. 10, No. 16, pp. 1787-1789.
Scandola et al., "Polymer Blends of Natural Poly(3-hydroxybutyrate-co-3-hydroxyvalerate) and a Synthetic Atactic Poly(3-hydroxybutrate). Characterization and Biodegradation Studies.", Macromolecules, 30(9): 2568-2574 (1997).
Tsuji et al., "Blends of Crystalline and Amorphous Poly(lactide) III. Hydrolysis of Solution-cast Blend Films" Journal of Applied Polymer Science, 64(7):855-863 (1997).
Whitehouse R.S. "Contact Adhesives", Critical Reports on Applied Chemistry, Synthetic Adhesives & Sealants, Chapter 1, vol. 16, edited by WC Wake (1987).
Willett et al., "Processing and properties of extruded starch/polymer foams", Polymer, vol. 43, pp. 5935-5947 (2002).
Xu et al., "In situ FTIR study on melting and crystallization of polyhydroxyalkanoates", Polymer, vol. 43, pp. 6893-6899 (2002).
Yoon et al., "Compatibility of poly(3-hydroxybutyrate)/poly(ethylene-co-vinyl acetate) blends", Polymer, vol. 39, No. 12, pp. 2479-2487 (1998).
Yoshie et al., Temperature dependence of cocrystallization and phase segregation in blends of poly(3-hydroxybutyrate) and poly(3-hydroxybutyrate-co-3-hydroxyvalerate), Polymer, vol. 42, pp. 8557-8563 (2001).
Yuan et al., "Miscibility and transesterification of phenoxy with biodegradable poly(3-hydroxybutyrate)", Polymer, vol. 39, vol. 10, pp. 1893-1897 (1998).
Zhang et al., "Miscibility, melting and crystallization behavior of two bacterial polyester/poly(epichlorohydrin-co-ethylene oxide) blend systems", Polymer, vol. 41, pp. 1429-1439 (2000).

* cited by examiner

US 7,928,167 B2

PHA BLENDS

CROSS REFERENCE TO RELATED APPLICATIONS

This application is a continuation of U.S. patent application Ser. No. 10/783,995, entitled "PHA Blends" filed on Feb. 20, 2004 which claims the benefit of U.S. Provisional Application No. 60/449,187, entitled "PHA Adhesive Compositions," filed on Feb. 21, 2003. The contents of these applications are hereby incorporated by reference in their entireties.

TECHNICAL FIELD

This invention relates to blends containing two or more polyhydroxyalkanoates (PHAs), and related methods and articles.

BACKGROUND

Polymers can be used as raw materials for the fabrication of a wide array of products. The end use of a particular polymer can sometimes be dictated by its physical properties. One or more physical properties of a polymer can be modified by blending it with another material.

SUMMARY

This invention relates to blends containing two or more polyhydroxyalkanoates (PHAs, also referred to herein as PHA blend components), and related methods and articles. In general, the PHA blends have one or more properties (e.g., flexibility) that are enhanced relative to the same one or more properties of the individual PHA blend components. In some embodiments, the blends can have two or more PHA blend components present in unequal amounts, and one or more properties of the blends are enhanced relative to the same one or more properties of the majority PHA blend component.

In one aspect, this invention features blends that have a first PHA and a second PHA, in which the second PHA is different from the first PHA and is blended with the first PHA. An amount of the first PHA in the blend is greater than an amount of the second PHA in the blend, and a stiffness of the blend is less than a stiffness of the first PHA. When the first PHA and the second PHA are blended, and the blend is molded, the blend has a deformation angle tolerance of at least about 5°.

In another aspect, this invention features blends that have a first PHA and a second PHA, in which the second PHA is different from the first PHA and is blended with the first PHA. An amount of the first PHA in the blend is greater than an amount of the second PHA in the blend, and a stiffness of the blend is less than a stiffness of the first PHA. When the first PHA and the second PHA are blended, and the blend is molded, the blend has a thermal deformation resistance temperature of at least about 80° C.

In a further aspect, this invention features blends that have a first PHA and a second PHA, in which the second PHA is different from the first PHA and is blended with the first PHA. An amount of the first PHA in the blend is greater than an amount of the second PHA in the blend, and a stiffness of the blend is less than a stiffness of the first PHA. When the first PHA and the second PHA are blended, and the blend is molded, the blend has a deformation angle tolerance of at least about 5° and a thermal deformation resistance temperature of at least about 80° C.

In one aspect, this invention features adhesive PHA blends that have a first PHA and a second PHA, in which the second PHA is different from the first PHA and is blended with the first PHA. An amount of the first PHA in the blend is greater than an amount of the second PHA in the blend, and a stiffness of the blend is less than a stiffness of the first PHA. The adhesive blends have a surface tack time value of at most about 15 seconds. When exposed to a pressure of at most about 100 psig, the adhesive blend can form a bond with a surface or itself, the bond having a peel bond strength of at least about 10 N/m.

In another aspect, this invention features PHA blends that have a first PHA, and a second PHA. The second PHA is different from the first PHA and the second PHA is a copolymer having at least three comonomers, in which each of the comonomers is different from one another. An amount of the first PHA in the blend is greater than an amount of the second PHA in the blend, and a stiffness of the blend is less than a stiffness of the first PHA. When the first PHA and the second PHA are blended, and the blend is molded, the blend has a deformation angle tolerance of at least about 5°.

In another aspect, this invention features PHA blends that have a first PHA, and a second PHA. The second PHA is different from the first PHA and the second PHA is a copolymer having at least three comonomers, in which each of the comonomers is different from one another. An amount of the first PHA in the blend is greater than an amount of the second PHA in the blend, and a stiffness of the blend is less than a stiffness of the first PHA. When the first PHA and the second PHA are blended, and the blend is molded, the blend has a thermal deformation resistance temperature of at least about 80° C.

In another aspect, this invention features adhesive PHA blends that have a first PHA, and a second PHA. The second PHA is different from the first PHA and the second PHA is a copolymer having at least three comonomers, in which each of the comonomers is different from one another. An amount of the first PHA in the blend is greater than an amount of the second PHA in the blend, and a stiffness of the blend is less than a stiffness of the first PHA. The adhesive blends have a surface tack time value of at most about 15 seconds. When exposed to a pressure of at most about 100 psig, the adhesive blend can form a bond with a surface or itself, the bond having a peel bond strength of at least about 10 N/m.

Embodiments can include one or more of the following features.

The blend can have a stiffness of at most about 250 MPa.

The blends can have a deformation angle tolerance of at least about 15°, at least about 30°, at least about 60°, at least about 90°, at least about 120°, or at least about 150°.

The first PHA and the second PHA can both be homopolymers.

The first PHA can be a homopolymer, (e.g., poly(3-hydroxybutyrate), polylactic acid, polyglycolic acid). The second PHA can be a copolymer having a first comonomer (e.g., 3-hydroxybutyrate) and a second comonomer (e.g., lactic acid, glycolic acid, 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenoate 3-hydroxytetradecanoate, 3-hydroxyhexadecanoate, 3-hydroxyoctadecanoate, 4-hydroxybutyrate, 4-hydroxyvalerate, 5-hydroxyvalerate, and 6-hydroxyhexanoate) in which the first comonomer is different from the second comonomer.

The first PHA can be a copolymer having a comonomer 1-A and a comonomer 1-B and the second PHA can be a copolymer having a comonomer 2-A and a comonomer 2-B.

In some embodiments, comonomer 1-A and comonomer 2-A can be the same comonomer (e.g., both are 3-hydroxybutyrate) and comonomer 1-B and comonomer 2-B are different from one another and different from comonomer 1-A and comonomer 2-A. The first PHA copolymer may contain at most about 99 percent by weight of comonomer 1-B, at most about 50 percent by weight of comonomer 1-B, at most about 15 percent by weight of comonomer 1-B, at most about 7 percent by weight of comonomer 1-B, at most about 1 percent by weight of comonomer 1-B. The second PHA copolymer may contain at most about 99 percent by weight of comonomer 2-B, at most about 50 percent by weight of comonomer 2-B, at most about 35 percent by weight of comonomer 2-B, at most about 15 percent by weight of comonomer 2-B, at most about 5 percent by weight of comonomer 2-B. In some embodiments, comonomer 1-B and comonomer 2-B can be any one of 3-hydroxyvalerate, 4-hydroxybutyrate, 3-hydroxyhexanoate, or 3-hydroxyoctanoate.

In other embodiments, the first PHA copolymer and the second PHA copolymer can be the same copolymer, in which the ratio of comonomer 1-A:comonomer 1-B is different from the ratio of comonomer 2-A:comonomer 2-B. Comonomer 1-A and comonomer 2-A can both be 3-hydroxybutyrate. Comonomer 1-B and comonomer 2-B can both be 3-hydroxypropionate, 4-hydroxybutyrate, 3-hydroxyhexanoate, or 3-hydroxyoctanoate, 3-hydroxypropionate, 6-hydroxyhexanoate, 3-hydroxydecanoate, 3-hydroxydodecanoate, or 3-hydroxydodecenoate.

The first PHA can be a homopolymer and the second PHA can be a copolymer having at least three comonomers, in which each of the comonomers is different from one another. The first PHA can be poly(3-hydroxybutyric acid) and the second PHA can be poly(3-hydroxybutyrate-co-3-hydroxyvalerate-co-3-hydroxyhexanoate) or poly(3-hydroxybutyrate-co-3-hydroxyhexanoate-co-3-hydroxyoctanoate-co-3-hydroxydecanoate-co-3-hydroxydodecanoate-co-3-hydroxydodecenoate).

The blends may contain at least about 90% by weight of the first PHA, at least about 70% by weight of the first PHA, at least about 51% by weight of the first PHA, and at most about 49% by weight of the second PHA, at most about 30% by weight of the second PHA, at most about 10% by weight of the second PHA.

The first PHA can have a first molecular weight and the second PHA can have a second molecular weight, in which the first molecular weight can be from about 10,000 Daltons to about 1,600,000 Daltons and second molecular weight can be from about 10,000 Daltons to about 1,600,000 Daltons.

In some embodiments, the first molecular weight can be from about 200,000 Daltons to about 650,000 Daltons and second molecular weight can be from about 200,000 Daltons to about 650,000 Daltons.

In other embodiments, one PHA can have a molecular weight that is at most about 200,000 Daltons, and the other PHA can have a molecular weight that is at most about 1,000,000 Daltons.

In still other embodiments, the first molecular weight and the second molecular weight can both be at most about 750,000 Daltons.

In some embodiments, one PHA can have a molecular weight that is about ten times greater than the molecular weight of the other PHA, about six times greater than the molecular weight of the other PHA, about three times greater than the molecular weight of the other PHA, about the same as the molecular weight of the other PHA.

The first PHA can have a first glass transition temperature and the second PHA can have a second glass transition temperature, in which the difference between the first and second glass transition temperatures is at least about 1° C., at least about 5° C., at least about 40° C., at least about 60° C., at least about 70° C., at least about 80° C., at least about 90° C., at least about 100° C., at least about 105° C., at least about 110° C., at least about 120° C.

The first PHA can have a first melt temperature and the second PHA can have a second melt temperature, wherein the difference between the first and second melt temperatures is at least about 10° C., or at least about 50° C.

The first PHA can have a first Hansen solubility parameter and the second PHA can have a second Hansen solubility parameter, in which the difference between the first and second Hansen solubility parameters is at least about 0.02 J/mol, at least about 0.04 J/mol, at least about 0.05 J/mol, at least about 0.10 J/mol.

The blends can be miscible blends.

The blends can be immiscible blends.

The blends can be partially miscible blends.

The blends can have a thermal deformation resistance temperature of at least about 85° C., at least about 90° C., at least about 100° C., at least about 120° C.

The first PHA copolymer can have a first glass transition temperature, a first melt temperature, and a first Hansen solubility parameter, and the second PHA copolymer can have a second glass transition temperature, a second melt temperature, and a second Hansen solubility parameter.

In some embodiments, both the first glass transition temperature and the first melt temperature are greater than and more positive than the second glass transition temperature and the second melt temperature.

In other embodiments, the blends can have a single glass transition temperature and a single melt temperature.

In still other embodiments, the glass transition temperature of the blend is substantially similar to the second glass transition temperature and the melt temperature of the blend is substantially similar to the first melt temperature.

The difference between the first Hansen solubility parameter and the second Hansen solubility parameter can be at most about 0.04 J/mol, or at least about 0.05 J/mol.

PHA blends can have a first PHA copolymer having a comonomer 1-A and a comonomer 1-B blended with a second PHA copolymer having a comonomer 2-A and a comonomer 2-B. In some embodiments, the first PHA copolymer can have a first Hansen solubility parameter and the second PHA copolymer can have a second Hansen solubility parameter, in which the difference between the first and second Hansen solubility parameters is at least about 0.02 J/mol. In some embodiments, the first PHA copolymer contains at most about 15 percent by weight of comonomer 1-B and the second PHA copolymer contains at most about 50 percent of comonomer 2-B. In some embodiments, one PHA copolymer can have a molecular weight that is at most about 200,000 Daltons, and the other PHA copolymer can have a molecular weight that is at most about 1,000,000 Daltons.

The blends can further include an additive selected from a starch, thermoplastic starch, a polybutylene succinate, a synthetic biodegradable resin, a polylactic acid, a polyglycolic acid cellulosic materials, a plant fiber, or a polyolefin.

The blends can have a surface tack time value of, for example, at most about 15 seconds.

The blends can have an open time of, for example, at least about 10 minutes.

The compositions can further include one or more solvents.

The compositions may contain one or more adhesive additives (e.g., one or more tackifiers, cross-linking agents, initiators, colorants, waxes, stabilizers and/or plasticizers).

The pressure can be, for example, at most about 50 psig.

The peel bond strength can be, for example, at least about 100 N/m.

In another aspect, this invention features PHA blends that contain a first PHA and a second PHA, in which the first PHA can be a homopolymer having a monomer repeat unit of formula (I),

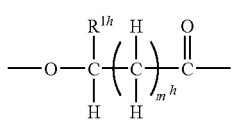

(I)

or a copolymer having monomer repeat units of formula (II) and formula (III):

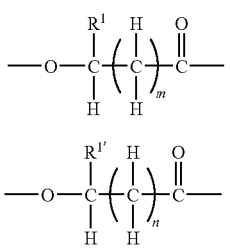

(II)

(III)

in which $R^1$ is different from $R^{1'}$ and/or m is different from n; and the second PHA can be a homopolymer having a monomer repeat unit of formula (IV):

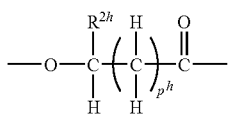

(IV)

or a copolymer having monomer repeat units of formula (V) and formula (VI):

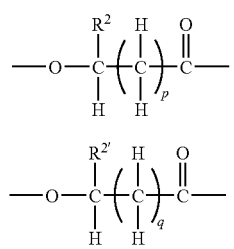

(V)

(VI)

in which $R^2$ is different from $R^{2'}$ and/or p is different from q; and in which each of $R^{1h}$, $R^1$, $R^{1'}$, $R^{2h}$, $R^2$, and $R^{2'}$ is H or $C_1$-$C_6$alkyl, and each of $m^h$, m, n, $p^h$, p, and q is 1, 2, or 3. In certain embodiments, when $R^2$ is $CH_3$, $R^{2'}$ is $CH_2CH_3$, and p and q are 1, then (a) $R^{1h}$ and $m^{2h}$ cannot be simultaneously $CH_3$ and 1, respectively. In some embodiments, $R^{1h}$ and $R^{2h}$ cannot both be $CH_3$ when $m^h$ and $p^h$ are both 1.

The first PHA can be a homopolymer.
$R^{1h}$ can be $C_1$-$C_3$ alkyl and $m^h$ can be 1.
$R^{1h}$ can be $CH_3$.

The second PHA can be a homopolymer or a copolymer.
$R^2$ can be $C_1$-$C_3$ alkyl and $R^{2'}$ can be $C_2$-$C_6$ alkyl.
$R^2$ can be $C_1$-$C_3$ alkyl and $R^{2'}$ can be H.
p can be 1 and q can be 2.
$R^2$ can be $CH_3$.
A copolymer may contain at most about 50 percent of monomer repeat units of formula (VI).
The first PHA and the second PHA can both be copolymers.
$R^1$ can be $C_1$-$C_3$ alkyl and $R^{1'}$ can be $C_2$-$C_6$ alkyl.
p and q can both be 1.
$R^1$ can be $CH_3$ and $R^{1'}$ can be $CH_2CH_3$, $CH_2CH_2CH_3$, or $CH_2CH_2CH_2CH_3$.
$R^1$ can be $C_1$-$C_3$ alkyl and $R^{1'}$ can be H.
p can be 1 and q can be 2.
$R^1$ can be $CH_3$.
$R^1$ and $R^{1'}$ can both be H.
A copolymer may contain at most about 15 percent of monomer repeat units of formula (III).
$R^2$ can be $C_1$-$C_3$ alkyl and $R^{2'}$ can be $C_2$-$C_6$ alkyl.
p and q can both be 1.
$R^2$ can be $CH_3$ and $R^{2'}$ is $CH_2CH_3$, $CH_2CH_2CH_3$, or $CH_2CH_2CH_2CH_3$.
$R^2$ can be $C_1$-$C_3$ alkyl and $R^{2'}$ can be H.
p can be 1 and q can be 2.
$R^1$ can be $CH_3$.
$R^2$ and $R^{2'}$ can both be H.
A copolymer may contain at most about 50% of monomer repeat units of formula (VI).
The first PHA copolymer and the second PHA copolymer can be the same.

Other embodiments may include any of the features described above.

In one aspect, this invention features an article that contains at least about 1 percent by weight, at least about 10 percent by weight, at least about 50 percent by weight, at least about 99 percent by weight of one or more of any of the PHA blends described herein.

In another aspect, this invention features a method of designing a PHA blend, the method includes selecting two or more PHA blend components on the basis of the Hansen solubility parameters of the PHA blend components.

In a further aspect, this invention features a method of preparing a PHA blend, the method includes blending a first PHA and a second PHA. In some embodiments, the first PHA and second PHA are solvent blended. In some embodiments, the first PHA and second PHA are emulsion blended. In some embodiments, the first PHA and second PHA are melt blended.

In one aspect, this invention features an article that includes a substrate having a surface; and an adhesive blend that contains a first PHA, and a second PHA, in which the second PHA is different from the first PHA and is blended with the first PHA. An amount of the first PHA in the blend is greater than an amount of the second PHA in the blend, and a stiffness of the blend is less than a stiffness of the first PHA. The blend is supported by the surface of the substrate. The blend has a surface tack time value of at most about 15 seconds, and, when exposed to a pressure of at most about 100 psig, the blend can form a bond with a surface of a second substrate, the bond having a peel bond strength of at least about 10 N/m.

In another aspect, this invention features an article that includes a substrate having a surface; and an adhesive blend that contains a first PHA, and a second PHA, in which the second PHA is different from the first PHA and is blended with the first PHA. An amount of the first PHA in the blend is greater than an amount of the second PHA in the blend, and a stiffness of the blend is less than a stiffness of the first PHA.

The blend is supported by the surface of the substrate. The blend has a surface tack time value of at most about 15 seconds, and the blend has an open time of at least about 70 minutes.

In a further aspect, this invention features a method, the method includes contacting a blend with a surface of an article and processing the blend to form a layer. The layer has a surface tack time value of at most about 15 seconds, and when exposed to a pressure of at most about 100 psig, the layer can form a bond, the bond having a peel bond strength of at least about 10 $Nm^{-2}$. The blend contains a first PHA, and a second PHA, in which the second PHA is different from the first PHA and is blended with the first PHA.

In one aspect, this invention features a method, which includes pressing a PHA blend between at least two surfaces to form a pressed PHA blend, the blend having a first PHA, and a second PHA, in which the second PHA is different from the first PHA and is blended with the first PHA and an amount of the first PHA in the blend is greater than an amount of the second PHA in the blend, and a stiffness of the blend is less than a stiffness of the first PHA; and separating the surfaces to expose the pressed PHA blend, the pressed PHA blend having a surface tack time value of at most about 15 seconds, in which when exposed to a pressure of at most about 100 psig, the pressed PHA blend can form a bond with a surface, the bond having a peel bond strength of at least about 10N/m.

Embodiments may have one or more of the following advantages.

In some embodiments, a relatively stiff, high melting PHA can be blended with a relatively flexible, lower melting PHA to provide a relatively high melting, flexible PHA blend.

In certain embodiments, the blends are on the one hand readily amenable to molding or shaping (e.g., as a stirrer, a spoon), but still are able to maintain their shape integrity when exposed to relatively high temperature materials (e.g., coffee, a baked potato).

In some embodiments, the PHA blends can be useful, e.g., for manufacturing articles for the food industry, e.g., molded utensils, food storage trays, food wraps, coated paper for cups, papers and wraps for fast food sandwiches, injection molded cups, blow molded bottles. In some embodiments, these articles can be manufactured, e.g., by injection molding, sheet extrusion, coextruded films, blown film, cast film, extruded fiber, blown fiber, spun-bonded fiber, hydroentangled fiber, blown foam, cast film, thermofoaming, or rotomolding conversion processes.

In some embodiments the PHA blends can be useful e.g. for manufacturing articles for the consumer products industry, e.g. fibers, non-wovens, diapers, feminine hygiene articles, wet wipes, or for medical applications such as hospital gowns and drapes.

In some embodiments the PHA blends can be useful e.g. for manufacturing articles for the automotive industry, e.g. fibers, non-wovens, carpets, mats, soundproofing and molded parts.

In some embodiments the PHA blends can be useful e.g. for the packaging industry e.g. films, coated papers, laminates, tapes, adhesives bottles and containers.

In some embodiments the PHA blends can contain other materials including nucleating agents, plasticizers, slip agents, fillers, thermal stabilizers and the like.

In some embodiments the PHA blends can be useful e.g. for blending with other materials including thermoplastic starches, polyglycolic acid polymers, polyvinyl alcohol polymers, polylactic acid polymers, or synthetic biodegradable polymers.

In certain embodiments, the molecular weights of the individual blend components are generally above $10^4$ Daltons, which can reduce the likelihood that a blend is extractable into a liquid or solid contact media.

In certain embodiments, the PHA blends can have good adhesive properties. In some embodiments, the PHA blend can be a relatively tacky adhesive composition, e.g., a pressure sensitive adhesive composition. In some applications, a surface coated with a PHA blend adhesive composition can be contacted with a second, uncoated surface using relatively light pressure to form an adhesive bond between the two surfaces.

In other embodiments, the PHA blends can be a relatively non-tacky adhesive composition, e.g., a contact adhesive composition or hot melt adhesive. In some applications, a surface coated with a PHA blend contact adhesive composition can be contacted with a second, coated or uncoated surface using relatively light pressure to form an adhesive bond between the two surfaces. When the surfaces are contacted under appropriate conditions of temperature and/or pressure, an adhesive bond can form between the surfaces.

Other features and advantages of the invention will be apparent from the description and from the claims.

DETAILED DESCRIPTION

This invention relates to blends containing two or more polyhydroxyalkanoates (PHAs, also referred to herein as PHA blend components), and related methods and articles.

In certain embodiments, a PHA blend can have relatively high flexibility. For example, in some embodiments, a PHA blend can have a relatively high deformation angle tolerance when molded into an article (e.g. a sheet, a film, a strip), and flexed so as to bring two ends of the article closer together. In certain embodiments, the deformation angle tolerance is at least about 1° (e.g., at least about 5°, at least about 10°, at least about 15°, at least about 20°, at least about 25°, at least about 30°, at least about 40°, at least about 50°, at least about 60°, at least about 70°, at least about 80°, at least about 85°, at least about 90°, at least about 95°, at least about 100°, at least about 110°, at least about 115°, at least about 120°, at least about 125°, at least about 130°, at least about 140°, at least about) 150°).

As used herein, the deformation angle tolerance of a PHA blend is determined as follows. The PHA blend components are blended in a Brabender single extruder or twin screw extruder or other melt processing equipment. The processing conditions include exposing the blends to a temperature regime that is between the peak melting temperature of the lowest melting PHA (as determined by differential scanning calorimetry, DSC) and 200° C. for a period of less than five minutes. The peak melting temperature of the lowest melting PHA is referred to herein as Tm(PHAα). In some embodiments, the temperature profile is: feed zone: between 170° C. and Tm(PHAα)+30° C. (where Tm(PHAα) is less than 140° C.); zone 1: between 165° C. and Tm(PHAα)+25° C.; zone 2: between 160° C. and Tm(PHAα)+20° C.; zone 3: between 160° C. and Tm(PHAα)+20° C.; die: between 160° C. and Tm(PHAα)+10° C. The molten PHA blend is extruded as a strand and passed through a water bath at a temperature between 10° C. and 80° C. to crystallize prior to being cut into pellets or underwater pelletized. The pellets are dried to remove residual moisture and then converted into a sheet or bar by compression molding, injection molding or sheet extrusion. For compression molding a temperature of between 200° C. and the DSC peak melting of the lower melting PHA (referred to herein as Tm(PHAβ)+10° C. is used. In certain embodiments, a compression molding temperature of 160° C. to 110° C. is found to provide acceptable flow of the polymer. The flexibility of the PHA blend is measured on film samples of a thickness that is between 0.1 mm and 0.5 mm. Deformation angle tolerance specimens (2.54 cm wide and 15 cm long) are either molded or cut from larger film samples. The specimens are flexed at room temperature by placing the specimen on a horizontal surface and raising one half of the length of the specimen off of the surface while keeping the other half stationary. The angle formed between the raised half of the specimen and the horizontal surface is the deformation angle. This angle is measured directly using a protractor. The deformation angle tolerance refers to the maximum angle that can be formed without breaking the specimen.

In certain embodiments, a PHA blend can be relatively resistant to loss in shape integrity when exposed to relatively high temperatures. For example, in some embodiments, a PHA blend can have a relatively high thermal deformation resistance temperature when molded into an article (e.g. a sheet, a film, a strip), immersed in a liquid or solid media that simulates a hot beverage, e.g., coffee, or hot foodstuff, e.g., a baked potato, for a particular time period, and subjected to flexing. In certain embodiments, the thermal deformation resistance temperature is at least about 80° C. (e.g., at least about 85° C., at least about 90° C., at least about 100° C., at least about 105° C., at least about 110° C., at least about 120° C.

As used herein the thermal deformation resistance temperature is determined as follows. Thermal deformation resistance temperature specimens are prepared as described for the deformation angle tolerance specimens, except that the length of the specimen is 7.5 cm and the thickness of the specimen is increased to between 1 mm and 2 mm. Alternatively, fabricated molded items may be used in the evaluation, e.g., injection molded knife, fork, spoon or molded cup. The specimen is totally immersed in an inert liquid at 85° C. for a period of 5 minutes (the specimen can also be immersed in an inert liquid at any test temperature between 80° C. and 120° C.). The liquid should not dissolve, react with, or be plasticizer for the PHA. The specimen is then removed from the liquid and held in a horizontal position at a point 5 cm from one end of the specimen under ambient conditions. The thermal deformation resistance temperature is the temperature at which the end of the specimen does not deflect more than 3 mm from the horizontal position.

In certain embodiments, the PHA blends described herein may have a relatively high flexibility and a relatively high service temperature. In other embodiments, the PHA blends may have a relatively high flexibility and/or a relatively high service temperature in combination with other useful properties, e.g., increased rate of biodegradability.

In certain embodiments, the PHA blends described herein may have a relatively low stiffness. In some embodiments, a PHA blend can have two or more PHA blend components present in unequal amounts, and the stiffness of the blend is less than the stiffness of the majority PHA blend component. In certain embodiments, PHA blends can have a stiffness of at most about 250 MPa (e.g., at most about 225 MPa, at most about 200 MPa, at most about 175 MPa, at most about 150 MPa).

A "biaxial tear test" can be used to evaluate stiffness of the PHA blends described herein. The test includes tensile loading of a 3-inch wide by 0.5 inch long strip of film along its longer edges, sing an Instron universal testing machine, after a 1 inch-long precut is placed in the center of the specimen using a sharp razor blade. The mode of loading applied at the tip of the preexisting cut is the cleavage mode, or tensile-opening mode, known as Mode I. The load experienced by the film upon drawing is recorded by the load cell to construct the load-displacement curve characteristic of the material. From the above experimental curve, it is possible to derive measures of stiffness.

In certain embodiments, a PHA blend adhesive composition can have a relatively low surface tack. For example, in some embodiments, a PHA blend adhesive composition can be substantially non-tacky to the touch prior to its use in forming an adhesive bond between two surfaces. In certain embodiments, a PHA blend adhesive composition can have a surface tack time value of at most about 15 seconds (e.g., at most about 12 seconds, at most about 10 seconds, at most about 9 seconds, at most about 8 seconds, at most about 7 seconds, at most about 6 seconds, at most about 5 seconds, at most about 4 seconds, at most about 3 seconds, at most about 2 seconds, at most about 1 second, at most 0.5 second, at most 0.1 second, zero seconds) prior to its use in forming an adhesive bond between two surfaces.

As referred to herein, the surface tack time value of a PHA blend adhesive composition is determined as follows. A galvanized steel washer having mass of 13.85 grams (g) with external diameter 38.17 millimeter (mm) and internal diameter 13.41 millimeter (mm) is placed onto a horizontally displaced surface that is coated with the PHA adhesive composition. The surface is then inverted, so that gravitational force on the object and the adhesive force of the composition on the object oppose each another. The time required for the object to fall from the surface is the surface tack time value of the PHA blend adhesive composition. In general, a PHA blend adhesive composition having a lower surface tack will have a shorter surface tack time value than a PHA blend adhesive composition having a higher surface tack.

In some embodiments, a PHA blend composition can form a relatively strong bond between two surfaces when exposed to a relatively low laminating pressure. For example, in certain embodiments, a PHA blend adhesive composition can form an adhesive bond between two surfaces with a peel bond strength of at least about 10 Newtons per square meter ($N/m^2$) (e.g., at least about 50 $N/m^2$, at least about 100 $N/m^2$, at least about 250 $N/m^2$, at least about 500 $N/m^2$, at least about 1000 $N/m^2$) when the PHA blend adhesive composition is exposed to a laminating pressure of at most about 100 pounds per square inch gauge (psig) (e.g., at most about 90 psig, at most about 80 psig, at most about 70 psig, at most about 60 psig, at most about 50 psig, at most about 40 psig, at most about 30 psig, at most about 20 psig, at most about 15 psig, at most about 10 psig, at most about 5 psig, at most about 1 psig).

As used herein, a laminating pressure refers to a pressure applied to the composition when it is in contact with both surfaces.

As referred to herein, the peel bond strength of a bond between the two surfaces is determined according to the ASTM 1995-92 test method by placing the bonded surfaces in an Instron tensile testing machine and evaluating the force required to separate the surfaces using a 90 degree peel angle and a crosshead speed of 25 millimeter/minute.

In some embodiments, a PHA blend adhesive composition can have a relatively long open time. For example, in certain embodiments, a PHA blend adhesive composition can have an open time of at least about 10 minutes (e.g., at least about 50 minutes, at least about 70 minutes at least about 100 minutes, at least about 200 minutes, at least about three hours, at least about six hours, at least about 12 hours, at least about 24 hours, at least about 48 hours, at least about 96 hours, at least about 120 hours). As used herein, the open time of a PHA blend adhesive composition refers to the maximum amount of time that the PHA blend adhesive composition can be exposed to ambient environmental conditions (e.g., ambient temperature, pressure, humidity) prior to its use in forming an adhesive bond. In some embodiments, the open time is generally an upper limit of permissible exposure and/or storage time of a PHA blend adhesive composition before the PHA blend adhesive composition is rendered a non-adhesive composition. In certain embodiments, the open time is exceeded when the PHA blend adhesive composition is unable to form an adhesive bond between two surfaces with a peel bond strength of at least about 10 N/m$^2$ when the compositions are exposed to a laminating pressure of at most about 100 psig.

PHA compositions having desirable adhesive properties are disclosed, for example, in U.S. Patent Application Ser. No. 60/449,187, filed on Feb. 21, 2003, entitled "PHA Adhesive Compositions," which is incorporated herein by reference.

In general, the blends may contain any number of different PHA blend components (e.g., two different PHAs, three different PHAs, four different PHAs, five different PHAs, six different PHAs).

In some embodiments, the blend may have two PHA components, e.g., a PHA(1) and a PHA(2), having at most about 1 weight percent of PHA(1) (e.g., at most about 3 weight percent of PHA(1), at most about 5 weight percent of PHA(1), at most about 10 weight percent of PHA(1), at most about 15 weight percent of PHA(1), at most about 20 weight percent of PHA(1), at most about 25 weight percent of PHA(1), at most about 30 weight percent of PHA(1), at most about 35 weight percent of PHA(1), at most about 40 weight percent of PHA(1), at most about 45 weight percent of PHA(1), at most about 50 weight percent of PHA(1), at most about 55 weight percent of PHA(1), at most about 60 weight percent of PHA(1), at most about 65 weight percent of PHA(1), at most about 70 weight percent of PHA(1), at most about 75 weight percent of PHA(1), at most about 80 weight percent of PHA(1), at most about 85 weight percent of PHA(1), at most about 90 weight percent of PHA(1), at most about 95 weight percent of PHA(1), at most about 99 weight percent of PHA(1)) and at most about 1 weight percent of PHA(2) (e.g., at most about 3 weight percent of PHA(2), at most about 5 weight percent of PHA(2), at most about 10 weight percent of PHA(2), at most about 15 weight percent of PHA(2), at most about 20 weight percent of PHA(2), at most about 25 weight percent of PHA(2), at most about 30 weight percent of PHA(2), at most about 35 weight percent of PHA(2), at most about 40 weight percent of PHA(2), at most about 45 weight percent of PHA(2), at most about 50 weight percent of PHA(2), at most about 55 weight percent of PHA(2), at most about 60 weight percent of PHA(2), at most about 65 weight percent of PHA(2), at most about 70 weight percent of PHA(2), at most about 75 weight percent of PHA(2), at most about 80 weight percent of PHA(2), at most about 85 weight percent of PHA(2), at most about 90 weight percent of PHA(2), at most about 95 weight percent of PHA(2), at most about 97 weight percent of PHA(2), and at most about 99 weight percent of PHA(2)).

In some embodiments, the blend may have three PHA components, e.g., a PHA(1), a PHA(2), and a PHA(3), having at most about 1 weight percent of PHA(1) (e.g., at most about 3 weight percent of PHA(1), at most about 5 weight percent of PHA(1), at most about 10 weight percent of PHA(1), at most about 15 weight percent of PHA(1), at most about 20 weight percent of PHA(1), at most about 25 weight percent of PHA(1), at most about 30 weight percent of PHA(1), at most about 31 weight percent of PHA(1), at most about 32 weight percent of PHA(1), at most about 33 weight percent of PHA(1), at most about 34 weight percent of PHA(1), at most about 35 weight percent of PHA(1), at most about 36 weight percent of PHA(1), at most about 37 weight percent of PHA(1), at most about 38 weight percent of PHA(1), at most about 39 weight percent of PHA(1), and at most about 40 weight percent of PHA(1)); having at most about 1 weight percent of PHA(2) (e.g., at most about 3 weight percent of PHA(2), at most about 5 weight percent of PHA(2), at most about 10 weight percent of PHA(2), at most about 15 weight percent of PHA(2), at most about 20 weight percent of PHA(2), at most about 25 weight percent of PHA(2), at most about 30 weight percent of PHA(2), at most about 31 weight percent of PHA(2), at most about 32 weight percent of PHA(2), at most about 33 weight percent of PHA(2), at most about 34 weight percent of PHA(2), at most about 35 weight percent of PHA(2), at most about 36 weight percent of PHA(2), at most about 37 weight percent of PHA(2), at most about 38 weight percent of PHA(2), at most about 39 weight percent of PHA(2), and at most about 40 weight percent of PHA(2)); and at most about 1 weight percent of PHA(3) (e.g., at most about 3 weight percent of PHA(3), at most about 5 weight percent of PHA(3), at most about 10 weight percent of PHA(3), at most about 15 weight percent of PHA(3), at most about 20 weight percent of PHA(3), at most about 25 weight percent of PHA(3), at most about 30 weight percent of PHA(3), at most about 35 weight percent of PHA(3), at most about 40 weight percent of PHA(3), at most about 45 weight percent of PHA(3), at most about 50 weight percent of PHA(3), at most about 55 weight percent of PHA(3), at most about 60 weight percent of PHA(3), at most about 65 weight percent of PHA(3), at most about 70 weight percent of PHA(3), at most about 75 weight percent of PHA(3), at most about 80 weight percent of PHA(3), at most about 85 weight percent of PHA(3), and at most about 90 weight percent of PHA(3)).

In some embodiments, the PHA blends may have at least about 51 weight percent of PHA(1) (at least about 55 weight percent of PHA(1), at least about 60 weight percent of PHA(1), at least about 70 weight percent of PHA(1), at least about 80 weight percent of PHA(1), at least about 90 weight percent of PHA(1), at least about 95 weight percent of PHA(1)) and at most about 49 weight percent (at most about 45 weight percent, at most about 40 weight percent, at most about 30 weight percent, at most about 20 weight percent, at most about 10 weight percent, at most about 5 weight percent) of one or more other PHA blend components (PHA(2), PHA(3), etc.).

In some embodiments, each of the PHA blend components can have a molecular weight of at least about 10,000 Daltons and at most from about 100,000 Daltons to about 2,000,000 Daltons (e.g., from about 100,000 Daltons to about 1,000,000 Daltons, from about 150,000 Daltons to about 800,000 Daltons, from about 175,000 Daltons to about 750,000 Daltons, from about 200,000 Daltons to about 650,000 Daltons). As used herein, molecular weight refers to a weight average molecular weight, which is determined by gel permeation chromatography, using, e.g., chloroform as both the eluent and diluent for the PHA samples. Calibration curves for determining molecular weights can be generated using polystyrene molecular weight standards.

In some embodiments, the blend may have two different PHA blend components in which one PHA can have a molecular weight of at least about 10,000 Daltons and at most about 200,000 Daltons (e.g., at most about 175,000 Daltons, at most about 150,000 Daltons, at most about 125,000 Daltons, at most about 100,000 Daltons) and the other PHA can have a molecular weight of at least about 50,000 Daltons and at most about 1,000,000 Daltons (e.g., at most about 900,000

Daltons, at most about 800,000 Daltons, at most about 750,000 Daltons, at most about 650,000 Daltons). In other embodiments, the molecular weight of one PHA is about ten times greater than the molecular weight of the other PHA (e.g., about nine times greater, about eight times greater, about seven times greater, about six times greater, about five times greater, about four times greater, about three times greater, about two times greater). In other embodiments, the molecular weight of each of the two PHA blend components is about the same.

In some embodiments, each of the PHA blend components can have a glass transition temperature (Tg) of from about −60° C. to about 70° C. (e.g., from about −50° C. to about 65° C., from about −30° C. to about 30° C., from about −25° C. to about 15° C., from about −20° C. to about 10° C.). As referred to herein, the Tg of a PHA is determined using differential scanning calorimetry (DSC) as follows. The sample is heated in a differential scanning calorimeter from e.g., −70° C. to +200° C. at 3° C./minute. The glass transition temperature is the inflection in the DSC heat capacity versus temperature curve.

In some embodiments, the blend may have two different PHA blend components in which the difference in Tg between the two PHAs is at least about 1° C. (e.g., at least about 5° C., at least about 10° C., at least about 20° C., at least about 30° C., at least about 40° C., at least about 60° C., at least about 70° C., at least about 80° C., at least about 90° C., at least about 100° C., at least about 105° C., at least about 110° C., at least about 120° C.).

In some embodiments, each of the PHA blend components can have a melt temperature (Tm) of from about 50° C. to about 190° C. (e.g., from about 55° C. to about 180° C., from about 75° C. to about 150° C., from about 100° C. to about 130° C. As referred to herein, the Tm of a PHA is determined using differential scanning calorimetry (DSC) as follows. The sample is heated in a differential scanning calorimeter from e.g., −70° C. to +200° C. at 3° C./minute. The melt temperature is determined from the DSC endotherm.

In some embodiments, a PHA can have a polydispersity index (PDI) of at least about 1.5 (e.g., at least about 1.8, at least about 2.1, at least about 2.2, at least about 2.3, at least about 2.4, at least about 2.5, at least about 2.6, at least about 2.7, at least about 2.8, at least about 2.9, at least about 3.0, at least about 4.0, at least about 5.0, at least about 6.0, at least about 7.0, at least about 8.0, at least about 9.0, at least about 10.0). As referred to herein, the PDI of a PHA is calculated by dividing the weight average molecular weight of the PHA by the number average molecular weight of the PHA. The number average molecular weight of a PHA can be measured using gel permeation chromatography.

A PHA can have a volume percent crystallinity of from about 0.1% to about 75% (e.g., from about 5% to about 60%, from about 20% to about 55%, from about 40% to about 50%). As referred to herein, the volume crystallinity of a PHA is determined from the data contained in the DSC heat capacity versus temperature curve and is calculated by dividing the crystalline mass of the PHA sample by the total mass of the PHA sample.

In some embodiments, the blend may have two different PHA blend components in which the difference in Tm between the two PHAs is at least about 10° C. (e.g., at least about 25° C., at least about 50° C., at least about 75° C., at least about 110° C., at least about 130° C.).

In some embodiments, PHA blend components can be selected on the basis of Hansen solubility parameters. As used herein, a Hansen solubility parameter of a PHA blend component are determined based upon: $\delta_D$, the dispersive or "non-polar" parameter; $\delta_P$, the polar parameter; and $\delta_H$, the hydrogen bonding parameter. These parameters are related to the Hildebrand parameter, $\delta$, by the expression: $\delta=(\delta_D^2+\delta_P^2+\delta_H^2)^{1/2}$, see, e.g., Hansen, C. M., *Hansen Solubility Parameter, A User's Handbook*, CRC Press, 1999. In certain embodiments, the blend may have two different PHA blend components in which the difference in Hansen solubility parameter ($\delta$) between the two PHAs is at least about 0.02 J/mol (at least about 0.03 J/mol, at least about 0.04 J/mol, at least about 0.05 J/mol, at least about 0.06 J/mol, at least about 0.07 J/mol, at least about 0.08 J/mol, at least about 0.09 J/mol, at least about 0.10 J/mol, at least about 0.11 J/mol, at least about 0.12 J/mol).

In some embodiments, the PHA blends, e.g., blends having two PHAs, can be miscible blends, immiscible blends, or partially miscible blends.

As used herein, a "miscible blend" refers to a blend having a single, composition-dependent Tg and a single, composition-dependent Tm, the observed Tm resulting from a composition-dependent depression of the Tm of the higher melting component. The term "composition-dependent" as used herein means that the values of Tg and Tm vary linearly with the mole fractions of the PHA blend components.

As used herein, an "immiscible blend" refers to a blend having composition-independent Tg(s) and Tm(s). The observed Tg(s) and Tm(s) of the immiscible blend are about the same in value to those of the neat components. In addition, the number of Tg(s) and Tm(s) of the immiscible blend is the same as the number of components, e.g., a two component PHA blend exhibits two composition-independent Tg(s) and two composition-independent Tm(s).

As used herein, the term "partially miscible blend" refers to a blend having two or more components and at least one Tg and at least one Tm, e.g., a two component blend may have only one Tg and one Tm. The Tg(s) and Tm(s) of the partially miscible blend may vary with changes in composition, but do not necessarily vary linearly with the mole fractions of the PHA blend components, e.g., the Tgs and Tms of the blend may be substantially similar to those of the individual components.

The Tg and Tm of PHA blends can be determined on melt-quenched samples of the blends, e.g., samples annealed at temperature that will destroy any thermal history and subsequently quenched in liquid nitrogen, using DSC as described previously.

In some embodiments, a PHA blend may be a partially miscible blend having two PHA blend components, e.g., a PHA(1) and a PHA(2), with PHA(1) having a Tg and Tm that is greater than and more positive than the Tg and Tm of PHA(2). In some embodiments, the blend exhibits a single Tg, which is about the same as the Tg of PHA(2), and a single Tm, which is about the same as the Tg of PHA(1). While not wishing to be bound by theory, it is believed that such a blend can be useful in the fabrication of articles that are both durable (e.g., high impact articles) and flexible because of the higher Tm and lower Tg, respectively.

In certain embodiments, PHA blend components for miscible blends, immiscible blends, or partially miscible blends may be selected on the basis of the difference in Hansen solubility parameter, e.g., for a two component blend, the absolute value of the difference obtained by subtracting the Hansen solubility parameter of one PHA from the other PHA. While not wishing to be bound by theory, it is believed that the difference in Hansen solubility parameter can be used to determine a priori whether or not a blend will be a miscible blend, an immiscible blend, or a partially miscible blend. Again, while not wishing to be bound by theory, it is believed that a difference in Hansen solubility parameter of about 0.05 J/mol or greater can generally result in a partially miscible or immiscible blend and a difference in Hansen solubility parameter of less than about 0.05 J/mol can generally result in a miscible blend. Thus, a method for designing a PHA blend on the basis of a Hansen solubility parameter is within the scope of this invention.

The component PHAs may be homopolymers, copolymers, or any combination of homopolymers and copolymers, e.g., two homopolymers, two copolymers, or one homopolymer and one copolymer The term "homopolymer" refers to polymers having the same monomer units. The term "copolymer" refers to a polymers having two or more (e.g., three, four, five, six, seven, eight, nine, ten) different monomer units (also referred to herein as comonomers or comonomer units) and includes, e.g., alternating, block, and random copolymers.

Examples of monomer units (including comonomers and comonomer units) include lactic acid, glycolic acid, 3-hydroxybutyrate, 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenaote 3-hydroxytetradecanoate, 3-hydroxyhexadecanoate, 3-hydroxyoctadecanoate, 4-hydroxybutyrate, 4-hydroxyvalerate, 5-hydroxyvalerate, and 6-hydroxyhexanoate.

Examples of PHA homopolymers include polylactic acid, polyglycolic acid, poly 3-hydroxyalkanoates (e.g., poly 3-hydroxypropionate, poly 3-hydroxybutyrate, poly 3-hydroxyhexanoate, poly 3-hydroxyheptanoate, poly 3-hydroxyoctanoate, poly 3-hydroxydecanoate, poly 3-hydroxydodecanoate), poly 4-hydroxyalkanoates (e.g., poly 4-hydroxybutyrate), poly 5-hydroxyalkanoates (e.g., poly 5-hydroxypentanoate), and poly 6-hydroxyalkanoates (e.g., poly 6-hydroxyhexanoate).

Examples of PHA copolymers include polylactic acid-co-glycolic acid, poly 3-hydroxybutyrate-co-3-hydroxypropionate, poly 3-hydroxybutyrate-co-3-hydroxyvalerate, poly 3-hydroxybutyrate-co-3-hydroxyhexanoate, poly 3-hydroxybutyrate-co-4-hydroxybutyrate, poly 3-hydroxybutyrate-co-4-hydroxyvalerate, poly 3-hydroxybutyrate-co-6-hydroxyhexanoate, poly 3-hydroxybutyrate-co-3-hydroxyheptanoate, poly 3-hydroxybutyrate-co-3-hydroxyoctanoate, poly 3-hydroxybutyrate-co-3-hydroxydecanoate, poly 3-hydroxybutyrate-co-3-hydroxydodecanotate, poly 3-hydroxybutyrate-co-3-hydroxyoctanoate-co-3-hydroxydecanoate, poly 3-hydroxydecanoate-co-3-hydroxyoctanoate, and poly 3-hydroxybutyrate-co-3-hydroxyoctadecanoate. Although examples of PHA copolymers having two different monomer units have been provided, a PHA can have more than two different monomer units (e.g., three different monomer units (for example, poly 3-hydroxybutyrate-co-3-hydroxyvalerate-co-3-hydroxyhexanoate), four different monomer units, five different monomer units (e.g., poly 3-hydroxybutyrate-co-3-hydroxyhexanoate-co-3-hydroxyoctanoate-co-3-hydroxydecanoate-co-3-hydroxydodecanoate-co-3-hydroxydodecenoate, in which the 3-hydroxybutyrate monomer content can be greater than 70% by weight), six different monomer units, seven different monomer units, eight different monomer units, nine different monomer units, etc.).

A subset of blends includes those having two different PHA blend components, e.g., a PHA(1) and a PHA(2), with PHA(1) being different from PHA(2).

In some embodiments, PHA(1) can be a homopolymer having a monomer unit of formula (I), or a copolymer having two different comonomers of formula (II) and formula (III). When PHA(1) is a homopolymer, $m^h$ can be 0-6 (e.g., 0-5, 0-4, 0-3, 0-2, 0-1) and $R^{1h}$

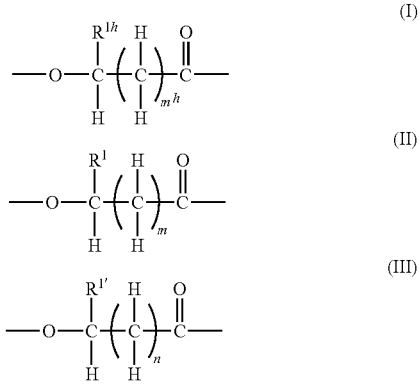

can be hydrogen, $C_1$-$C_{16}$ alkyl (e.g., $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl), or $C_2$-$C_{16}$ alkenyl (e.g., $C_2$ alkenyl, $C_3$ alkenyl, $C_4$ alkenyl, $C_5$ alkenyl, $C_6$ alkenyl, $C_7$ alkenyl, $C_8$ alkenyl, $C_9$ alkenyl, $C_{10}$ alkenyl, $C_{11}$ alkenyl, $C_{12}$ alkenyl, $C_{13}$ alkenyl, $C_{14}$ alkenyl, $C_{15}$ alkenyl, $C_{16}$ alkenyl). The term "alkyl" refers to a hydrocarbon chain that may be a straight chain or branched chain containing the indicated number of carbon atoms. For example, $C_1$-$C_6$ alkyl indicates that the group may have from 1 to 6 (inclusive) carbon atoms in it. The term "alkenyl" refers to a straight or branched hydrocarbon chain having one or more double bonds. Examples of alkenyl groups include, but are not limited to, allyl, propenyl, 2-butenyl, 3-hexenyl and 3-octenyl groups. One of the double bond carbons may optionally be the point of attachment of the alkenyl substituent. In certain embodiments, $m^h$ is 1-6 (e.g., 1-5, 1-4, 1-3, 1-2) and at least one methylene group (—$CH_2$—) is present between the carbonyl group (C=O) and the carbon bearing the sidechain, $R^{1h}$. When PHA(1) is a copolymer, m can be 0-6 (e.g., 0-5, 0-4, 0-3, 0-2, 0-1) and $R^1$ can be hydrogen, $C_1$-$C_{16}$ alkyl (e.g., $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl), or $C_2$-$C_{16}$ alkenyl (e.g., $C_2$ alkenyl, $C_3$ alkenyl, $C_4$ alkenyl, $C_5$ alkenyl, $C_6$ alkenyl, $C_7$ alkenyl, $C_8$ alkenyl, $C_9$ alkenyl, $C_{10}$ alkenyl, $C_{11}$ alkenyl, $C_{12}$ alkenyl, $C_{13}$ alkenyl, $C_{14}$ alkenyl, $C_{15}$ alkenyl, $C_{16}$ alkenyl). in formula (II), and n can be 0-6 (e.g., 0-5, 0-4, 0-3, 0-2, 0-1) and $R^{1'}$ can be hydrogen, $C_1$-$C_{16}$ alkyl (e.g., $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl), or $C_2$-$C_{16}$ alkenyl (e.g., $C_2$ alkenyl, $C_3$ alkenyl, $C_4$ alkenyl, $C_5$ alkenyl, $C_6$ alkenyl, $C_7$ alkenyl, $C_8$ alkenyl, $C_9$ alkenyl, $C_{10}$ alkenyl, $C_{11}$ alkenyl, $C_{12}$ alkenyl, $C_{13}$ alkenyl, $C_{14}$ alkenyl, $C_{15}$ alkenyl, $C_{16}$ alkenyl). in formula (III). In certain embodiments, both m and n are 1-6 (e.g., 1-5, 1-4, 1-3, 1-2) and at least one methylene group (—$CH_2$—) is present between the carbonyl group (C=O) and the carbons bearing the sidechains, $R^1$ and $R^{1'}$. In general, $R^1$ can be different from $R^{1'}$, and/or m can be different from n. The values for $R^1$, $R^{1'}$, m, and n can be selected independently of one another.

In some embodiments, PHA(2) can be a homopolymer having a monomer unit of formula (IV), or a copolymer having two different comonomers of formula (V) and formula (VI). When PHA(2) is a homopolymer, $p^h$ can be 0-6 (e.g., 0-5, 0-4, 0-3, 0-2, 0-1) and $R^{2h}$

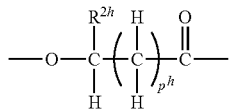
(IV)

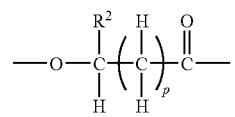
(V)

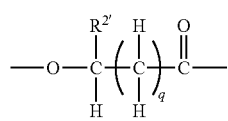
(VI)

can be hydrogen, $C_1$-$C_{16}$ alkyl (e.g., $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl), or $C_2$-$C_{16}$ alkenyl (e.g., $C_2$ alkenyl, $C_3$ alkenyl, $C_4$ alkenyl, $C_5$ alkenyl, $C_6$ alkenyl, $C_7$ alkenyl, $C_8$ alkenyl, $C_9$ alkenyl, $C_{10}$ alkenyl, $C_{11}$ alkenyl, $C_{12}$ alkenyl, $C_{13}$ alkenyl, $C_{14}$ alkenyl, $C_{15}$ alkenyl, $C_{16}$ alkenyl). In certain embodiments, $p^h$ is 1-6 (e.g., 1-5, 1-4, 1-3, 1-2) and at least one methylene group (—$CH_2$—) is present between the carbonyl group (C=O) and the carbon bearing the sidechain, $R^{2h}$. When PHA(2) is a copolymer, p can be 0-6 (e.g., 0-5, 0-4, 0-3, 0-2, 0-1) and $R^2$ can be hydrogen, $C_1$-$C_{16}$ alkyl (e.g., $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl), or $C_2$-$C_{16}$ alkenyl (e.g., $C_2$ alkenyl, $C_3$ alkenyl, $C_4$ alkenyl, $C_5$ alkenyl, $C_6$ alkenyl, $C_7$ alkenyl, $C_8$ alkenyl, $C_9$ alkenyl, $C_{10}$ alkenyl, $C_{11}$ alkenyl, $C_{12}$ alkenyl, $C_{13}$ alkenyl, $C_{14}$ alkenyl, $C_{15}$ alkenyl, $C_{16}$ alkenyl). in formula (V), and q can be 0-6 (e.g., 0-5, 0-4, 0-3, 0-2, 0-1) and $R^{2'}$ can be hydrogen, $C_1$-$C_{16}$ alkyl (e.g., $C_1$ alkyl, $C_2$ alkyl, $C_3$ alkyl, $C_4$ alkyl, $C_5$ alkyl, $C_6$ alkyl, $C_7$ alkyl, $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl), or $C_2$-$C_{16}$ alkenyl (e.g., $C_2$ alkenyl, $C_3$ alkenyl, $C_4$ alkenyl, $C_5$ alkenyl, $C_6$ alkenyl, $C_7$ alkenyl, $C_8$ alkenyl, $C_9$ alkenyl, $C_{10}$ alkenyl, $C_{11}$ alkenyl, $C_{12}$ alkenyl, $C_{13}$ alkenyl, $C_{14}$ alkenyl, $C_{15}$ alkenyl, $C_{16}$ alkenyl). in formula (VI). In certain embodiments, both p and q are 1-6 (e.g., 1-5, 1-4, 1-3, 1-2) and at least one methylene group (—$CH_2$—) is present between the carbonyl group (C=O) and the carbons bearing the sidechains, $R^2$ and $R^{2'}$. In general, $R^2$ can be different from $R^{2'}$, and/or p can be different from q. The values for $R^2$, $R^{2'}$, p, and q can be selected independently of one another.

In some embodiments, blends having two PHA components can include: homopolymer-homopolymer blends (both PHA(1) and PHA(2) are homopolymers, Blend Type H—H in Table 1); homopolymer-copolymer blends (e.g., PHA(1) is a homopolymer and PHA(2) is a copolymer, Blend Type H—C in Table 1); and copolymer-copolymer blends (e.g., PHA(1) is a copolymer and PHA(2) is a copolymer, Blend Type C—C in Table 1). The combinations are summarized in Table 1 along with the appropriate monomer or comonomer formulas (I)-(VI).

TABLE 1

Summary of Blends Having 2 PHA Components

| Blend Type | PHA(1) monomer/comonomer formula | PHA(1) monomer/comonomer formula |
|---|---|---|
| H-H | (I) | (IV) |
| H-C | (I) | (V)(VI) |
| C-C | (II)(III) | (V)(VI) |

H—H blends include poly 3-hydroxybutyrate (PHB, $m^h$=1, $R^{1h}$=$CH_3$ in (I)) as one of the PHA components. In certain embodiments, an H—H blend includes PHB as the major component blended with a PHA having a longer sidechain, e.g. poly 3-hydroxyoctanoate (PHO, $p^h$=1, $R^{2h}$=$(CH_2)_4CH_3$ in formula (IV)). In another embodiment, an H—H blend includes poly 3-hydroxybutyrate PHB as the major component blended with poly 4-hydroxybutyrate as the minor component.

H—C blends include poly 3-hydroxybutyrate (PHB, $m^h$=1, $R^{1h}$=$CH_3$ in formula (I)) as the homopolymer PHA component. The copolymer component preferably includes 3-hydroxybutyrate as one comonomer (p=1, $R^2$=$CH_3$ in formula (V)) and either a branched, e.g., 3-hydroxyvalerate (q=1, $R^{2'}$=$CH_2CH_3$ in formula (VI)) or 3-hydroxyhexanoate ((q=1, $R^{2'}$=$CH_2CH_2CH_3$ in formula (VI)), or unbranched, e.g., 4-hydroxybutyrate (q=2, $R^{2'}$=H in formula (VI)) as the other comonomer. Comonomer (VI) may also include, e.g., 3-hydroxyoctanoate (q=1, $R^{2'}$=$CH_2CH_2CH_2CH_2CH_3$ in formula (VI)).

A copolymer can have at most about 1 weight percent of one comonomer (e.g., at most about 3 weight percent of one comonomer, at most about 7 weight percent of one comonomer, at most about 10 weight percent of one comonomer, at most about 13 weight percent of one comonomer, at most about 15 weight percent of one comonomer, at most about 20 weight percent of one comonomer, at most about 25 weight percent of one comonomer, at most about 30 weight percent of one comonomer, at most about 31 weight percent of one comonomer, at most about 32 weight percent of one comonomer, at most about 33 weight percent of one comonomer, at most about 34 weight percent of one comonomer, at most about 35 weight percent of one comonomer, at most about 40 weight percent of one comonomer, at most about 45 weight percent of one comonomer, at most about 50 weight percent of one comonomer, at most about 60 weight percent of one comonomer, at most about 75 weight percent of one comonomer, at most about 85 weight percent of one comonomer, at most about 95 weight percent of one comonomer, at most about 99 weight percent of one comonomer) and at most about 1 weight percent of the other comonomer (e.g., at most about 3 weight percent of the other comonomer, at most about 7 weight percent of the other comonomer, at most about 10 weight percent of the other comonomer, at most about 13 weight percent of the other comonomer, at most about 15 weight percent of the other comonomer, at most about 20 weight percent of the other comonomer, at most about 25 weight percent of the other comonomer, at most about 30 weight percent of the other comonomer, at most about 31 weight percent of the other comonomer, at most about 32 weight percent of the other comonomer, at most about 33 weight percent of the other comonomer, at most about 34 weight percent of the other comonomer, at most about 35 weight percent of the other comonomer, at most about 40 weight percent of the other comonomer, at most about 45 weight percent of the other comonomer, at most about 50 weight percent of the other comonomer, at most about 60 weight percent of the other comonomer, at most about 75 weight percent of the other comonomer, at most about 85 weight percent of the other comonomer, at most about 95 weight percent of the other comonomer, at most about 99 weight percent of the other comonomer).

Exemplary H—C blends include poly 3-hydroxybutyrate blended with poly 3-hydroxybutyrate-co-11%-4-hydroxybutyrate and poly 3-hydroxybutyrate blended with poly 3-hydroxybutyrate-co-33%-4-hydroxybutyrate, poly3-hydroxybutyrate blended with poly3-hydroxybutyrate-co-6%-3-hydroxyhexanoate. Other exemplary H—C blends include poly 3-hydroxybutyrate blended with poly 3-hydroxybutyrate-co-X, in which X is selected from 3-hydroxyhexanoate, 3-hydroxyoctanoate, 3-hydroxydecanoate, 3-hydroxydodecanoate, and 3-hydroxydodecenoate. In some embodiments, the blends contain at least about 70 weight percent of the homopolymer, poly 3-hydroxybutyrate.

In some embodiments, a blend can include a homopolymer (e.g., polylactic acid) blended with a homopolymer or copolymer having a relatively low Tg (e.g., a Tg below about 0° C., a Tg below about −5° C., a Tg below about −10° C., a Tg below about −15° C., a Tg below about −20° C., a Tg below about −25° C., a Tg below about −25° C., a Tg below about −30° C., a Tg below about −35° C., a Tg below about −40° C., a Tg below about −45° C., a Tg below about −50° C., a Tg below about −55° C.). In some embodiments, the blend can be an H—H blend or an H—C blend. For example, poly(lactic acid) can be blended with poly(4-hydroxybutyrate).

C—C blends may include one of the following comonomer combinations.

In some embodiments, each of the comonomers is a different monomer unit, e.g., comonomer (II), comonomer (III), comonomer (V), and comonomer (VI) are all different from one another, e.g., (II)≠(III)≠(V)≠(VI). In certain embodiments, comonomers (II), (III), (IV), and (V) are selected from 3-hydroxybutyrate, 3-hydroxypropionate, 3-hydroxyvalerate, 4-hydroxybutyrate, 3-hydroxyhexanoate or 3-hydroxyoctanoate.

In some embodiments, one of the comonomers in PHA(1) can be the same as one of the comonomers in PHA(2), e.g., comonomer (II) and comonomer (V) can be the same comonomer, and the other comonomer in PHA(1) can be different from the other comonomer in PHA(2), e.g., (II)=(V)≠(III)≠(VI). In certain embodiments, (II) and (V) can be 3-hydroxybutyrate and (III) and (VI) can be selected from 3-hydroxyvalerate, 4-hydroxybutyrate, 3-hydroxyhexanoate or 3-hydroxyoctanoate, provided that (III) and (V) are different comonomers.

In some embodiments, PHA(1) and PHA(2) can be the same copolymer, e.g., (II)=(V)≠(III)=(VI), in which the ratios of (II)/(III) are different from (V)/(VI). In certain embodiments, (II) and (V) can both be 3-hydroxybutyrate and (III) and (VI) can both be, e.g., 4-hydroxybutyrate, 3-hydroxyhexanoate or 3-hydroxyoctanoate. In some embodiments, it may not be desirable to have (II)=(V)=3-hydroxybutyrate and (III)=(VI)=3-hydroxyvalerate, in which the copolymer is poly 3-hydroxybutyrate-co-3-hydroxyvalerate (PHBV). While not wishing to be bound by theory, PHBV is isodimorphic (the 3-hydroxyvalerate fits into the 3-hydroxybutyrate crystal lattice and vice versa), and as a result, the final degree of crystallinity of, e.g., PHBV(8%), and, e.g., PHBV(20%), can be the same.

Each copolymer may have, independently, at most about 1 weight percent of one comonomer (e.g., at most about 3 weight percent of one comonomer, at most about 7 weight percent of one comonomer, at most about 10 weight percent of one comonomer, at most about 13 weight percent of one comonomer, at most about 15 weight percent of one comonomer, at most about 20 weight percent of one comonomer, at most about 25 weight percent of one comonomer, at most about 30 weight percent of one comonomer, at most about 31 weight percent of one comonomer, at most about 32 weight percent of one comonomer, at most about 33 weight percent of one comonomer, at most about 34 weight percent of one comonomer, at most about 35 weight percent of one comonomer, at most about 40 weight percent of one comonomer, at most about 45 weight percent of one comonomer, at most about 50 weight percent of one comonomer, at most about 60 weight percent of one comonomer, at most about 75 weight percent of one comonomer, at most about 85 weight percent of one comonomer, at most about 95 weight percent of one comonomer, at most about 99 weight percent of one comonomer) and at most about 1 weight percent of the other comonomer (e.g., at most about 3 weight percent of the other comonomer, at most about 7 weight percent of the other comonomer, at most about 10 weight percent of the other comonomer, at most about 13 weight percent of the other comonomer, at most about 15 weight percent of the other comonomer, at most about 20 weight percent of the other comonomer, at most about 25 weight percent of the other comonomer, at most about 30 weight percent of the other comonomer, at most about 31 weight percent of the other comonomer, at most about 32 weight percent of the other comonomer, at most about 33 weight percent of the other comonomer, at most about 34 weight percent of the other comonomer, at most about 35 weight percent of the other comonomer, at most about 40 weight percent of the other comonomer, at most about 45 weight percent of the other comonomer, at most about 50 weight percent of the other comonomer, at most about 60 weight percent of the other comonomer, at most about 75 weight percent of the other comonomer, at most about 85 weight percent of the other comonomer, at most about 95 weight percent of the other comonomer, at most about 99 weight percent of the other comonomer).

Exemplary C—C blends include poly 3-hydroxybutyrate-co-8%-3-hydroxyvalerate blended with poly 3-hydroxybutyrate-co-33%-4-hydroxybutyrate; poly 3-hydroxybutyrate-co-6%-3-hydroxyhexanoate blended with poly 3-hydroxybutyrate-co-33%-4-hydroxybutyrate; poly 3-hydroxybutyrate-co-7%-4-hydroxybutyrate blended with poly 3-hydroxybutyrate-co-33%-4-hydroxybutyrate; poly 3-hydroxybutyrate-co-8%-3-hydroxyvalerate blended with poly 3-hydroxybutyrate-co-20%-3-hydroxyhexanoate and polylactic acid blended with poly 3-hydroxybutyrate-co-33%-4-hydroxybutyrate.

Another subset of blends includes those having two different PHA blend components, e.g., a PHA(1) and a PHA(2), with PHA(1) being different from PHA(2), and one of PHA (1) and PHA(2) is a copolymer having at least three different monomer units (e.g., at least four different monomer units, at least five different monomer units, at least six different monomer units, at least seven different monomer units, at least eight different monomer units, at least nine different monomer units, at least ten different monomer units). In some embodiments, PHA(1) can be a homopolymer, e.g., poly 3-hydroxybutyrate and PHA(2) can be a copolymer having 3-7 different monomer units (3, 4, 5, 6, or 7 different monomer units). Examples can include poly 3-hydroxybutyrate blended with poly 3-hydroxybutyrate-co-3-hydroxyvalerate-co-3-hydroxyhexanoate, and poly 3-hydroxybutyrate blended with poly 3-hydroxybutyrate-co-3-hydroxyhexanoate-co-3-hydroxyoctanoate-co-3-hydroxydecanoate-co- 3-hydroxydodecanoate-co-3-hydroxydodecenoate. In some embodiments, the comonomer can have at least about 60% (at least about 70%, at least about 80%, at least about 90%) of the 3-hydroxybutyrate comonomer. In some embodiments, the blend can have at least about 50% of poly(3-hydroxybutyrate) (e.g., at least about 60%, at least about 70%, at least about 80%, at least about 90%, at least about 95%, at least about 99%).

In certain embodiments, the PHA can be derived from biomass, such as plant biomass and/or microbial biomass (e.g., bacterial biomass, yeast biomass, fungal biomass). Biomass-derived PHA can be formed, for example, via enzymatic polymerization of the monomer units. The biomass can be formed of one or more of a variety of entities. Such entities include, for example, microbial strains for producing PHAs (e.g., *Alcaligenes eutrophus* (renamed as *Ralstonia eutropha*), *Bacillus, Alcaligenes latus, Azotobacter, Aeromonas, Comamonas, Pseudomonads*), genetically engineered organisms, for producing PHAs (e.g., *Pseudomonas, Ralstonia, Escherichia coli, Klebsiella*), yeasts for producing PHAs, and plant systems for producing PHAs. Such entities are disclosed, for example, in Lee, *Biotechnology & Bioengineering* 49:1-14 (1996); Braunegg et al., (1998), J. Biotechnology 65: 127-161; Madison, L. L. and Huisman, G. W. (1999), Metabolic Engineering of Poly(3-Hydroxyalkanoates): From DNA to Plastic. Microbiol. Mol. Biol. Rev. 63, 21-53; and Snell and Peoples 2002, Metabolic Engineering 4: 29-40, which are hereby incorporated by reference.

In certain embodiments, the PHA can be derived by chemical synthesis, such as by the ring opening polymerization of β-lactone monomers using various catalysts or initiators such as aluminoxanes, distannoxanes, or alkoxy-zinc and alkoxyaluminum compounds (see Agostini, D. E. et al. *Polym. Sci*, Part A-1, 9: 2775-2787 (1971); Gross, R. A. et al., *Macromolecules* 21:2657-2668 (1988); Dubois, P. I. et al., *Macromolecules*, 26:4407-4412 (1993); LeBorgne, A. and Spassky, N. *Polymer*, 30:2312-2319 (1989); Tanahashi, N. and Doi, Y. *Macromolecules*, 24:5732-5733 (1991); Hori, Y. M. et al., *Macromolecules*, 26:4388-4390 (1993); Kemnitzer, J. E. et al., *Macromolecules*, 26:1221-1229 (1993); Hori, Y. M. et al., *Macromolecules*, 26:5533-5534 (1993); Hocking, P. J. and Marchessault, R. H., *Polym Bull.*, 30: 163-170 (1993). The PHA can also be obtained by condensation polymerization of esters (see Hubbs, J. C. and Harrison, M. N. U.S. Pat. No. 5,563,239) or by chemoenzymatic methods (see Xie, et al., *Macromolecules*, 30:6997-6998 (1997)).

In some embodiments, a relatively low molecular weight PHA can be obtained as follows. A PHA of a weight average molecular weight of at least about 10,000 Daltons (e.g., at least about 80,000 Daltons, at least about 100,000 Daltons, at least about 150,000 Daltons, at least about 200,000 Daltons, at least about 300,000 Daltons, prepared, at least about 400,000 Daltons, at least about 500,000 Daltons, at least about 600,000 Daltons, at least about 700,000 Daltons, at least about 800,000 Daltons, at least about 900,000 Daltons, at least about 1,000,000 Daltons, at least about 1,600,000 Daltons, at least about 2,000,000 Daltons) is prepared (e.g., by one of the methods described above). The PHA is then subjected to an acid hydrolysis reaction during which the hydrolytic cleavage of one or more monomer units from the PHA can occur. The loss of one or more monomer units can result in the production of a lower molecular weight PHA (a PHA with fewer monomer units than the PHA introduced at the beginning of the hydrolysis reaction). The acid hydrolysis reaction can occur in the presence of a strong acid catalyst, e.g. sulfuric or hydrochloric acid. The reaction can be performed at ambient temperature or elevated temperatures of at least about 70° C. (e.g., at least about 80° C., at least about 90° C., at least about 100° C., at least about 110° C., at least about 120° C., at least about 130° C., at least about 140° C.). The reaction can optionally be carried out in the presence of alcohols, diols or polyols, whereby a lower molecular weight PHA can be obtained in which the terminal carboxyl group of the PHA can be esterifed. PHA hydrolysis reactions are described in commonly owned, copending U.S. patent application Ser. No. 09/999,782 (Publication Date: Jun. 6, 2002; Publication No.: US 2002/0068810 A1), which is hereby incorporated by reference.

In general, the PHA blends can be prepared as solvent blends, emulsion blends, or melt blends. Solvent blending generally involves dissolution of the PHA blend components in a solvent, e.g., an organic solvent, and casting the solution as a film. Emulsion blending generally involves combining the blend components in two or more immiscible solvents to form an emulsion and casting the emulsion as a film. Finally, melt blending generally involves combining the blend components in melt form in which the components are relatively free of solvents.

In certain embodiments, a PHA blend can be prepared by solvent blending. For example, PHA components can be dissolved in a solvent or solvent mixture to form a solution that contains at most about 50 weight percent of the PHAs (e.g., at most about 45 weight percent of the PHAs, at most about 40 weight percent of the PHAs, at most about 35 weight percent of the PHAs, at most about 30 weight percent of the PHAs, at most about 25 weight percent of the PHAs, at most about 20 weight percent of the PHAs, at most about 15 weight percent of the PHAs, at most about 14 weight percent of the PHAs, at most about 13 weight percent of the PHAs, at most about 12 weight percent of the PHAs, at most about 11 weight percent of the PHAs, at most about 10 weight percent of the PHAs, at most about 9 weight percent of the PHAs, at most about 8 weight percent of the PHAs, at most about 7 weight percent of the PHAs, at most about 6 weight percent of the PHAs, at most about 5 weight percent of the PHAs, at most about 2.5 weight percent of the PHAs, at most about 1 weight percent of the PHAs). In other embodiments, each PHA component can be prepared as a separate solution, and the solutions can subsequently be combined.

In general, a solvent can be selected as desired. Examples of organic solvents include hexane, heptane, benzene, toluene, ether, methyl tent-butyl ether (MTBE), ethyl acetate, butyl acetate, methylene chloride, chloroform, acetonitrile, methanol, ethanol, isopropanol, and 2,2,2-trifluoroethanol, methyl isobutyl ketone (MIBK), cyclohexanone, butyl-acetate. Solvents and solvent systems useful for the extraction of polymers from biomass may also be used and are disclosed in U.S. Patent Application Ser. No. 60/401,498, filed on Aug. 6, 2002, and entitled "Solvent Extraction System;" U.S. Pat. No. 5,213,976, entitled "Process for obtaining a polyhydroxyalkanoate from the cell material of a microogranism;" U.S. Pat. No. 5,821,299, entitled "Solvent Extraction of Polyhydroxy-Alkanoates from Biomass Facilitated by the Use of Marginal Nonsolvent;" U.S. Pat. No. 5,894,062, entitled "Process for the Recovery of Polyhydroxyalkanoic Acid;" U.S. Pat. No. 5,942,597, entitled "Solvent Extraction of Polyhydroxyalkanoates from Biomass;" U.S. Pat. No. 6,043,063, entitled "Methods of PHA Extraction and Recovery Using Non-Halogenated Solvents;" U.S. Pat. No. 6,087,471, entitled "High Temperature PHA Extraction Using PHA-Poor Solvents;" Brazil Patent Application Abstract PI 9302312-0 A, published on Feb. 7, 1995, entitled "The Biopolymer Extraction Process;" WO 98/46782, published on Oct. 22, 1998, entitled "Methods of PHA Extraction and Recovery Using Non-Halogenated Solvents;" and WO 01/68890 A2, published on Sep. 20, 2001, entitled "Prevention of Gelation of Polyhydroxyalkanoate Solutions Using Shear;" each of which is incorporated herein by reference.

The solvent can be a single or mixed solvent. In certain embodiments, the solvent can be a mixed solvent system comprising two or more solvents. Such solvent systems include homogeneous mixed aqueous solvent mixtures (e.g., acetonitrile/water), homogeneous mixed organic solvent mixtures (e.g., MTBE/butylacetate, cyclohexanone/heptane, butylacetate/methyl isobutyl ketone), heterogeneous mixed organic solvent mixtures (e.g., heptane/acetonitrile, toluene/ethanol, toluene/methanol), or heterogeneous mixed organic solvent/water mixtures (e.g., coalescing solvents, e.g. toluene/water).

The PHA blend solution can be applied to a surface (e.g., by machine or by hand) to form a layer (e.g., a substantially uniform layer) of the PHA blend solution on the surface. In some embodiments, the blend layer can have a thickness of at most about 300 microns (μ) (e.g., at most about 275μ, at most about 250μ, at most about 225μ, at most about 200μ, at most about 175μ, at most about 150μ).

Some or all of the solvent can then be removed to leave behind a layer of the PHA blend on the surface. In certain embodiments, solvent removal can be carried out by natural evaporation (e.g., under ambient conditions with substantially no deliberate displacement of solvent vapors from the vicinity of the substrate or forced evaporation). In some embodiments, solvent removal can be carried out by deliberate displacement of solvent vapors from the vicinity of the blend (e.g., by a directed stream of air or an inert gas, such as nitrogen or argon). In other embodiments, the solvent may be removed by one of the methods described above followed removing residual solvent from the blend at reduced pressure, e.g., at a pressure of about 5 torr (about 1 torr, about 0.10 ton, about 0.05 torr). Solvent removal can be carried out, for example, at a temperature of at most about 60° C. (e.g., at most about 50° C., at most about 40° C., at most about 35° C., at most about 30° C., at most about 25° C., at most about 20° C., at most about 15° C.).

The extent of solvent removal can be monitored by gravimetric methods (e.g. drying of the blend until a constant weight of the blend is achieved) or spectroscopic techniques (e.g., removing a sample of the blend from the substrate surface and obtaining a $^1$H NMR spectrum of the sample to detect the solvent).

In some embodiments, a PHA blend can contain one or more solvents. For example, in certain embodiments, a PHA blend adhesive composition can contain at most about 90 weight percent solvent (e.g., at most about 80 weight percent solvent, at most about 75 weight percent solvent, at most about 70 weight percent solvent, at most about 65 weight percent solvent, at most about 60 weight percent solvent, at most about 55 weight percent solvent, at most about 50 weight percent solvent, at most about 45 weight percent solvent, at most about 40 weight percent solvent, at most about 35 weight percent solvent, at most about 30 weight percent solvent, at most about 25 weight percent solvent, at most about 20 weight percent solvent.

In certain embodiments, a PHA blend can contain one or more components in addition to the PHA's. In some embodiments, the additional component can be a biodegradable additive, e.g., thermoplastic starches, polyvinyl alcohol polymers, synthetic biodegradable polymers. In other embodiments, the additional component can be an performance additive, e.g., an adhesive performance additive, e.g., a tackifier, a cross-linking agent, a wax. In some embodiments, a PHA blend can contain a nucleating agent, e.g., cyanuric acid. Nucleating agents having desirable properties are described in U.S. Provisional Application 60/533,640, entitled "Nucleating Agents," and filed on Dec. 30, 2003, which is hereby incorporated by reference.

In some embodiments, a PHA blend can contain at most about 95 weight percent (e.g., at most about 90 weight percent, at most about 80 weight percent, at most about 70 weight percent, at most about 60 weight percent, at most about 50 weight percent, at most about 40 weight percent, at most about 30 weight percent, at most about 20 weight percent, at most about 10 weight percent, at most about five weight percent, at most about one weight percent) of one or more additional components and/or at least about 5 weight percent total PHA (e.g., at least about 10 weight percent total PHA, at least about 20 weight percent total PHA, at least about 30 weight percent total PHA, at least about 40 weight percent total PHA, at least about 50 weight percent total PHA, at least about 60 weight percent total PHA, at least about 70 weight percent total PHA, at least about 80 weight percent total PHA, at least about 90 weight percent total PHA, at least about 95 weight percent total PHA, at least about 99 weight percent total PHA).

In certain embodiments, a PHA blend can contain one or more adhesive additives. For example, in some embodiments, a PHA adhesive composition can contain at most about 95 weight percent adhesive additive (e.g., at most about 90 weight percent adhesive additive, at most about 85 weight percent adhesive additive, at most about 80 weight percent adhesive additive, at most about 75 weight percent adhesive additive, at most about 70 weight percent adhesive additive, at most about 65 weight percent adhesive additive, at most about 60 weight percent adhesive additive, at most about 55 weight percent adhesive additive, at most about 50 weight percent adhesive additive, at most about 45 weight percent adhesive additive, at most about 40 weight percent adhesive additive, at most about 35 weight percent adhesive additive, at most about 30 weight percent adhesive additive, at most about 25 weight percent adhesive additive, at most about 20 weight percent adhesive additive, at most about 15 weight percent adhesive additive, at most about 10 weight percent adhesive additive, at most about 5 weight percent adhesive additive, at most about 1 weight percent adhesive additive, at most 0.5 weight percent adhesive additive) with the remainder being one or more PHAs and optionally one or more solvents.

Examples of adhesive additives include tackifiers (e.g., hydrocarbon tackifying resins). Hydrocarbon tackifying resins are commercially available, for example, as a terpene-type resin, (tradename ZONOREX, Arizona Chemical Company) or a phenolic modified terpene resin (tradename PICOTEX, Hercules Corporation).

In some embodiments, the substrate surface containing the layer of the PHA blend adhesive composition can be used for forming an adhesive bond with a second substrate surface when the PHA adhesive composition contains at most about 10 weight percent (e.g., at most about 9 weight percent, at most about 8 weight percent, at most about 7 weight percent, at most about 6 weight percent, at most about 5 weight percent, at most about 4 weight percent, at most about 3 weight percent, at most about 2 weight percent, at most about 1 weight percent, at most 0.5 weight percent, at most 0.1 weight percent) solvent.

In certain embodiments, a PHA blend adhesive composition can be formed by placing a PHA blend between two substrate surfaces and pressing the surfaces with a pressure (e.g., at most about 10 psig, at most about 5 psig, at most about 1 psig) at a desired temperature (e.g., at most about 130° C. (e.g., at most about 120° C., at most about 110° C., at most about 100° C., at most about 90° C., at most about 80° C.) for a period of time (e.g., at most about 30 seconds, at most about 20 seconds, at most about 15 seconds, at most about 10 seconds, at most about 5 seconds, at most about 1 second). For example, a household iron can be used during this process. The pressed substrate surfaces can then be cooled (e.g., to at most about 20° C., at most about 15° C., at most about 10° C.) for a period of time (e.g., at least about 5 minutes, at least about 10 minutes, at least about 15 minutes). The substrate surfaces can then be separated and stored at a desired temperature (e.g., at least about 20° C., at least about 23° C., at least about 25° C., at least about 27° C.) for a period of time (e.g., at least about 60 minutes, at least about 70 minutes, at least about 80 minutes, at least about 90 minutes, at least about 100 minutes).

In certain embodiments, when two surfaces are to be adhered to one another, one substrate surface can be coated with the adhesive composition and the second surface can be uncoated. In other embodiments, both surfaces can be coated with the PHA blend adhesive composition.

In certain embodiments, lamination can be carried out by applying pressure over the area of the contacted substrate surfaces, wherein the surfaces are disposed on a horizontal platform. The laminating pressure can be applied with, for example, the palm of a human hand, a hand-operated roller, or mechanical press.

Each substrate surface can represent a top, side, bottom, etc. of any article. In certain embodiments, the substrate surface can be an overlaying surface which is secured to the top, side, bottom, etc. of any article (e.g., a plastic film lining a cardboard box interior or exterior). In some embodiments, the two substrate surfaces to be laminated can be located on the same article e.g., two overlapping flaps used to seal the contents of a box or similar container. In other embodiments, the two substrate surfaces to be laminated can be located on two separate articles.

The substrate surfaces can be composed of materials, which can include, for example, Mylar, paper, coated paper, poly(ethylene terephthalate) (PET), PHA films, fibers, non-wovens or other articles, polylactic acid films, non wovens, food trays or containers, synthetic biodegradable polyesters films or articles, Cellophane™, or aluminum foil. In certain embodiments, the two substrate surfaces to be laminated can be made of the same material. In other embodiments, the two substrate surfaces can be made of different materials The follow examples are illustrative, and not to be construed as limiting.

EXAMPLES

Example 1

Preparation of PHA Blends

PHAs were dissolved in chloroform at 3-8 w/w % loading at room temperature under agitation, typically 30-60 minutes. The solutions of PHA1 and PHA2 were blended in the desired ratios and mixed ultrasonically for 3 minutes to ensure complete homogeneity of the solutions. The solution is poured into an aluminum foil dish of diameter approximately 5 cm to a depth of around 3-4 mm. The solvent was allowed to evaporate slowly under ambient conditions for 2 days and the residual solvent then removed by vacuum drying at 5 torr and 50° C.

The following blends were prepared using this procedure: poly 3-hydroxybutyrate blended with poly 3-hydroxyoctanoate (blend 4 in Table 2); poly 3-hydroxybutyrate-co-6%-3-hydroxyhexanoate blended with poly 3-hydroxybutyrate-co-33%-4-hydroxybutyrate (blends 8 and 9 in Table 3); poly 3-hydroxybutyrate-co-7%-4-hydroxybutyrate blended with poly 3-hydroxybutyrate-co-33%-4-hydroxybutyrate (blends 6 and 7 in Table 3); poly 3-hydroxybutyrate blended with poly 3-hydroxybutyrate-co-11%-4-hydroxybutyrate (blends 2 and 3 in Table 3); and poly 3-hydroxybutyrate blended with poly 3-hydroxybutyrate-co-33%-4-hydroxybutyrate (blends 10 and 11 in Table 3).

Example 2

Evaluation of PHA Blend Flexibility and Blend Thermal Deformation Resistance

Comparative compositions 1 and 5 and PHA blends 2-4 were prepared as described above (see Table 2) and molded into deformation angle tolerance specimens and thermal deformation resistance temperature specimens using the procedure below.

TABLE 2

|  | 1 pbw | 2 pbw | 3 pbw | 4 pbw | 5 pbw |
|---|---|---|---|---|---|
| PHB Mw 520,000 | 100 | 65 | 50 | 100 |  |
| PHB co 11% 4HB Mw 650,000 |  | 35 | 50 |  | 100 |
| PHO* Mw 120,000 |  |  |  | 20 |  |
| Acetyl tributyl citrate | 2.5 | 2.5 | 2.5 | 2.5 | 2.5 |
| Talc | 35 | 35 | 35 | 50 | 35 |
| Boron nitride | 0.5 | 0.5 | 0.5 |  |  |
| Acrawax | 1 | 1 | 1 |  | 1 |
| Flexibility | broke within 5 degree deformation | could not be broken even up to 120 degree deformation | could not be broken even up to 120 degree deformation | could not be broken even up to 90 degree deformation | could not be broken even up to 120 degree deformation |
| Thermal Deformation (85° C., 2 mm specimens) | very brittle, easily broken, would fail utensil test; <1 mm deflection | could not be broken, good strength, would pass utensil test; 1 mm deflection | could not be broken, good strength, would pass utensil test; 2 mm deflection | could not be broken, good strength, would pass utensil test; 3 mm deflection | could not be broken, some loss in strength, would fail utensil test; 5 mm deflection |
| Hansen Solubility Parameter | 19.93 J/mole | 20.02 J/mole | 20.02 J/mole |  |  |

*Hansen Solubility Parameter for PHO is 18.67 J/mole

The above compositions were blended in a Brabender twin screw extruder using a barrel temperature profile of: feed port, 180° C.; zone 1, 165° C.; zone 2, 160° C.; Die, 160° C.

sured off the reversing heat flow curves. Tan delta was measured using DMA operating at 1 Hz frequency with a heating rate of 3° C./minute.

TABLE 3

| Ref | PHB pbw | 6% HH pbw | 7% 4HB pbw | 33% 4HB pbw | Tg mid C | Tm Peak C | tan delta 1 C | tan delta 2 C |
|---|---|---|---|---|---|---|---|---|
| 6 | | | 74.2 | 25.8 | −19.7 | 132.2 | 14.5 | sl shoulder |
| 7 | | | 62.1 | 37.9 | −19.8 | 131.9 | 10.7 | sl shoulder |
| 8 | | 78 | | 22 | −21.0 | 140.0 | 19.6 | −8.19 |
| 9 | | 65.4 | | 34.6 | −19.9 | 139.7 | 16.7 | −12.88 |
| 10 | 67.4 | | | 32.6 | −21.7 | 170.7 | 24.4 | −8.56 |
| 11 | 82.6 | | | 17.4 | −25.4 | 171.7 | 18.8 | −10.17 |
| 12 | | | 96.3 | 3.6 | −26.7 | 134.7 | 10.6 | sl shoulder |
| 13 | | | | 100 | −21.9 | 55.7 | −4.1 | |
| 14 | | | 100 | | 0.2 | 127.4 | 10.2 | |
| 15 | | 100 | | | 10.2 | 137.7 | 16.8 | |
| 16 | 100 | | | | 6.8 | 176.7 | 26.4 | |

The blends were extruded into a water bath, cooled and granulated. The compounds are then injection molded using the same temperature profile in the extruder barrel and a mold temperature of 70-80° C.

The results above demonstrate that blending poly 3-hydroxybutyrate (PHB) with other PHAs results in blends having increased flexibility relative to the parent polymer, PHB. The increase flexibility is observed with both PHA homopolymers and copolymers.

Dynamic mechanical analysis (DMA) was carried out using a TA Instruments model 2980 unit with a tensile mode attachment. Specimen geometry is 0.1-0.2 mm thick, 10 mm wide and 50 mm long. The specimen is cooled to −70° C. using liquid nitrogen and conditioned for 3 minutes. The specimen is heated at 3° C./minute to 150° C. whilst being subjected to an oscillating frequency of 1 Hz. DMA analysis of tensile bars showed that compounds 1, 2, 3 and 5 all exhibited a single tan delta peak indicating a single-phase morphology. Compound 4 exhibited two tan delta peaks indicating a two-phase morphology. Miscibility of a two component polymer blend is defined when only a single glass transition temperature is observed, in which the glass transition temperature has an intermediary value between those of the two individual components. Partial miscibility of two component polymer blend is defined when broadening of two resolvable glass transition temperatures is observed. Immiscibility of a two component polymer blend is defined when two glass transition temperatures is observed, which correspond to the glass transition temperatures of the individual components.

Example 3

Glass Transition Temperature and Melt Temperature Profile of PHA Blends and PHA Blend Components Comparative compositions 13-16 and PHA blends 6-12 were prepared as described above (see Table 2) and molded into samples for analysis (see Table 3). The glass transition temperature Tg and peak melting transition were measure by modulate differential scanning calorimetry (MDSC). MDSC analyses are carried out using a TA Instruments Q100 MDSC unit. The specimen mass is 5-10 mg, which placed in a sealed aluminum pan. The specimen is cooled to −70° C. and conditioned for 3 minutes. Specimen is heated at 3° C./minute to 200° C. whilst being subjected to an oscillating temperature cycle of 0.6° C. every 60 seconds. The Tg and Tm are mea- Hansen Solubility Parameters: PHB co 7% 4HB, 19.97 J/mole; PHB co 11% HH, 19.85 J/mole; PHB co 33% 4HB, 20.16 J/mole Comparative examples 13-16 all exhibited a single glass transition temperature and melting transition. Blends 6-12 all exhibited a melting transition about the same as the higher melting PHA (the major component) and a Tg similar to the PHA having the lower Tg (the minor component). In blends 6-12, the blends essentially retain the Tm of the major PHA blend component (larger and more positive Tg and Tm) and exhibit the Tg of the minor PHA blend component (smaller and less positive Tg and Tm). The blends exhibit a single Tm and Tg demonstrating the partial miscibility, as indicated by a second tan delta peak or a distinct shoulder on tan delta curve.

The films were assessed for flexibility (specimen thickness=0.25 cm). Example 16 (PHB) broke easily. Examples 6-15 were more flexible than PHB. The data is summarized in Table 4.

TABLE 4

| ref 6 | did not break at 110 degrees |
|---|---|
| ref 7 | did not break at 130 degrees |
| ref 8 | at 90 degrees, slight stress whitening |
| ref 9 | did not break at 100 degrees |
| ref 10 | did not break at 90 degrees, slight stress whitening |
| ref 11 | did break at 80 degrees |
| ref 12 | did not break at 90 degrees, slight stress whitening |
| ref 13 | did not break at 150 degrees |
| ref 14 | did not break at 75 degrees, slight stress whitening |
| ref 15 | did not break at 60 degrees, slight stress whitening |
| ref 16 | broke at 10 degrees |

Examples 6 and 7 showed improved flexibility over control examples 14 at room temperature. After immersion of the samples in water at 85° C., examples 6 and 7 behaved in a similar manner to example 14, showing no apparent reduction in durability. Examples 8 and 9 showed improved flexibility over control examples 15. After immersion of the samples in water at 85 C, examples 8 and 9 behaved in a similar manner to example 15, showing no apparent reduction in durability.

Example 4

Preparation and Evaluation of Molded Utensils

Molded utensils were prepared having the compositions shown in Table 5. The control group contained as the PHA component poly(3-hydroxybutyrate) and comparative utensil (1) contained as the PHA component a blend of poly(3-hydroxybutyrate) and poly(3-hydroxybutyrate-co-4-hydroxybutyrate).

TABLE 5

|  | control | 1 |
|---|---|---|
| PHB co 11% 4HP |  | 35 |
| PHB homopolymer | 100 | 65 |
| talc | 30 | 30 |
| Citrasol A4 | 2.5 | 2.5 |
| Acrawax | 0.5 | 0.5 |
| Cyanuric Acid | 0.5 | 0.5 |

The above formulations were compounded on a twin screw extruder to form pellets. The compounds were then injection molded into a single cavity utensil mold using a Sumitomo injection molding machine according to the conditions shown in Table 6.

TABLE 6

| A | B | PP Spoon | PHA Control Spoon | PHA 1 Spoon |
|---|---|---|---|---|
| Feed port F. | F. | 430 | 360 | 360 |
| Zone 1 F. | F. | 435 | 330 | 330 |
| Zone 2 F. | F. | 440 | 320 | 320 |
| Die F. | F. | 420 | 310 | 310 |
| Mold temperature | F. | 50 | 110 | 110 |
| Cycle Time | s | 9.0 | 8.8 | 9.0 |
| Fill time | s | 0.3 | 0.7 | 0.7 |
| Plasticizing time | s | 6.8 | 3.3 | 3.5 |
| Cooling cycle | s | 3.5 | 3.5 | 3.5 |

F. = ° Fahrenheit; s = seconds; PP = impact grade polypropylene with melt index 7

All three utensil were found to have <3 mm deflection after immersion of the utensil in an inert liquid maintained 85° C. When assessed for flexibility under ambient conditions, the PHA control broke within a 10° deformation. PP and PHA(1) utensils could not be broken even up to 90° deformation.

Example 5

Blown Film Demonstration

Molten polymer is generated in a singlescrew extruder and is extruded through a ring die to form a tube. The tube is drawn for a distance to allow the polymer to crystallize and then closed with nip rollers to provide a seal. Air is introduced into the tube to expand the diameter of the tube to about 2-3 times the diameter of the die to produce a stable bubble structure (DR Collins Line Configuration: 45 mm screw; L:D 25:1—LLDPE screw profile; Die diameter 100 mm—die gap 1.2 mm Zone).

|  |  | Feed | 1 | 2 | 3 | 4 | 5 | Die |
|---|---|---|---|---|---|---|---|---|
| Temperature | ° C. | 170 | 166 | 161 | 161 | 155 | 150 | 150 |

Melt temperature: 145° C.
Screw speed: 17 rpm

TABLE 7

|  | Parts |
|---|---|
| PHB co 8% HV | 80 |
| PHB co 33% 4HB | 20 |
| Citraflex A4 | 10 |
| Cyanuric acid | 1 |

The film having the composition shown in Table 7 produced a blown film having a tensile strength of 19 M/mm$^2$, 124% elongation at break and a tear strength of 60 N/mm. A comparative system based on a film having PHB co 8% HV only along with Citraflex A4 and cyanuric acid (no PHB co 33% 4HB present) produced a blown film having a tensile strength of 22 M/mm$^2$, 40% elongation at break and a tear strength of 5 N/mm.

Other embodiments are in the claims.

What is claimed is:

1. A blend comprising a first PHA and a second PHA, wherein:
   the first PHA is a copolymer consisting of a comonomer I-A and a comonomer I-B;
   the second PHA is a copolymer consisting of a comonomer 2-A and a comonomer 2-B;
   the first PHA copolymer and the second PHA copolymer are the same copolymer, in which the ratio of comonomer 1-A:comonomer I-B in the first PHA is different from the ratio of comonomer 2-A:comonomer 2-B in the second PHA;
   comonomer I-A and comonomer 2-A are both 3-hydroxybutyrate;
   the first PHA and the second PHA are miscible; and
   the first PHA has a first glass transition temperature and the second PHA has a second glass transition temperature, wherein the difference between the first and second glass transition temperature is at least about 5° C.

2. The blend of claim 1, wherein comonomer I-B and comonomer 2-B both are 3-hydroxypropionate, 4-hydroxybutyrate, 3-hydroxyhexanoate, 3-hydroxyoctanoate, 6-hydroxyhexanoate, 3-hydroxydecanoate, 3-hydroxydodecanoate, or 3-hydroxydodecenoate.

3. The blend of claim 1, wherein comonomer I-B and comonomer 2-B both are 4-hydroxybutyrate.

4. The blend of claim 1 additionally comprising a third PHA.

5. The blend of claim 1, wherein when the first PHA and the second PHA are blended and the blend is molded, the blend has a deformation angle tolerance of at least 5°.

6. The blend of claim 1, wherein when the first PHA and the second PHA are blended and the blend is molded, the blend has a thermal deformation resistance temperature of at least 80° C.

7. The blend of claim 1, wherein the difference between the first and second glass transition temperature is at least 10° C.

8. The blend of claim 1, wherein the difference between the first and second glass transition temperature is at least 20° C.

9. An article comprising at least 1 percent by weight of a PHA blend comprising a first PHA and a second PHA, wherein:
   the first PHA is a copolymer consisting of a comonomer I-A and a comonomer I-B;
   the second PHA is a copolymer consisting of a comonomer 2-A and a comonomer 2-B;
   the first PHA copolymer and the second PHA copolymer are the same copolymer, in which the ratio of comonomer 1-A:comonomer I-B in the first PHA is different from the ratio of comonomer 2-A:comonomer 2-B in the second PHA;

comonomer I-A and comonomer 2-A are both 3-hydroxybutyrate;

the first PHA and the second PHA are miscible; and the first PHA has a first glass transition temperature and the second PHA has a second glass transition temperature, wherein the difference between the first and second glass transition temperature is at least about 5° C.

10. A method of preparing a PHA blend comprising blending a first PHA with a second PHA;

wherein:
- the first PHA is a copolymer consisting of a comonomer I-A and a comonomer I-B;
- the second PHA is a copolymer consisting of a comonomer 2-A and a comonomer 2-B;
- the first PHA copolymer and the second PHA copolymer are the same copolymer, in which the ratio of comonomer 1-A:comonomer I-B in the first PHA is different from the ratio of comonomer 2-A:comonomer 2-B in the second PHA;
- comonomer I-A and comonomer 2-A are both 3-hydroxybutyrate;
- the first PHA and the second PHA are miscible; and
- the first PHA has a first glass transition temperature and the second PHA has a second glass transition temperature, wherein the difference between the first and second glass transition temperature is at least about 5° C.

11. The method of claim 10, wherein the blending is by solvent blending, emulsion blending or melt blending.

12. The method of claim 10, wherein the PHA blend is prepared using solvent blending.

13. The method of claim 10, wherein the solvent blending comprising:
   (i) dissolving the first PHA and the second PHA in a solvent or solvent mixture; or dissolving the first PHA and the second PHA separately in a solvent or solvent mixture and combining; to form a blended PHA solution containing at most 50 weight percent of the first PHA and the second PHA;
   (ii) applying the PHA solution to a surface to form a PHA blend solution layer on the surface; and
   (iii) removing some or all of the solvent to form a PHA blend layer on the surface.

* * * * *